United States Patent
Horsfield et al.

(10) Patent No.: US 12,540,706 B2
(45) Date of Patent: Feb. 3, 2026

(54) NOZZLE

(71) Applicant: Performance Fluids Ltd, Nelson (GB)

(72) Inventors: David Horsfield, Nelson (GB); Sean Bergin, Nelson (GB)

(73) Assignee: PERFORMANCE FLUIDS LTD, Nelson (GB)

( * ) Notice: Subject to any disclaimer, the term of this patent is extended or adjusted under 35 U.S.C. 154(b) by 0 days.

(21) Appl. No.: 18/420,967

(22) Filed: Jan. 24, 2024

(65) Prior Publication Data

US 2024/0247754 A1    Jul. 25, 2024

(30) Foreign Application Priority Data

Jan. 24, 2023 (GB) ..................................... 2301021
Dec. 11, 2023 (GB) ..................................... 2318869

(51) Int. Cl.
*F16N 21/04* (2006.01)
(52) U.S. Cl.
CPC .......... *F16N 21/04* (2013.01); *F16N 2210/33* (2013.01)
(58) Field of Classification Search
CPC ........ F16N 21/04; F16N 2210/33; F16N 5/02; B65G 45/08
USPC ...................................................... 184/15.1
See application file for complete search history.

(56) References Cited

U.S. PATENT DOCUMENTS

| | | | | |
|---|---|---|---|---|
| 1,042,996 A * | 10/1912 | Barrett | ................... | B65G 45/08 184/15.1 |
| 1,655,213 A * | 1/1928 | Zerk | ................... | B60R 17/00 184/105.3 |
| 1,767,527 A * | 6/1930 | Jones | ................... | F16N 21/04 425/458 |
| 1,781,554 A * | 11/1930 | Norton | ................... | F16N 21/04 251/339 |
| 1,939,978 A * | 12/1933 | Hartman | ................... | F16N 5/02 222/320 |
| 2,103,161 A * | 12/1937 | Viggo | ................... | F16H 57/05 384/396 |
| 2,259,977 A * | 10/1941 | Allcott | ................... | F16N 21/02 184/105.3 |
| 2,270,754 A * | 1/1942 | Ginter | ................... | F16C 43/04 184/5.1 |
| 2,502,659 A * | 4/1950 | Livingston | ............. | B65G 45/08 184/15.1 |
| 2,681,711 A * | 6/1954 | Sievenpiper | ............... | F16C 1/24 184/105.1 |
| 2,712,402 A * | 7/1955 | Sprankl | ................... | F16N 21/04 141/383 |

(Continued)

OTHER PUBLICATIONS

Office Action received for Great Britain Patent Application No. 2301021.8, mailed on Jul. 7, 2023, 8 pages.

(Continued)

*Primary Examiner* — Henry Y Liu
(74) *Attorney, Agent, or Firm* — ARENTFOX SCHIFF LLP

(57) ABSTRACT

The present invention relates to the field of nozzles. More specifically the invention relates to nozzles for the application of lubricant. Yet more specifically the invention relates to nozzles for the application of lubricant to chains. And yet more specifically the invention of lubricant to chains for use in the baking industry, for example to the application of lubricant to pin lubrication holes in chains in the baking industry.

21 Claims, 14 Drawing Sheets

(56) References Cited

U.S. PATENT DOCUMENTS

| | | | | |
|---|---|---|---|---|
| 3,053,371 | A * | 9/1962 | Fischer | B65G 45/08 198/500 |
| 3,073,415 | A * | 1/1963 | Dutton | B65G 45/08 184/15.2 |
| 3,113,337 | A * | 12/1963 | Lyden | F16H 57/05 184/102 |
| 3,180,533 | A * | 4/1965 | Sundholm | F16N 3/12 184/105.3 |
| 3,442,303 | A * | 5/1969 | Kellems | B67C 3/32 141/165 |
| 3,503,470 | A * | 3/1970 | Lister | F16N 7/34 184/15.1 |
| 3,554,324 | A * | 1/1971 | Watley | F16N 21/04 184/105.3 |
| 3,589,470 | A * | 6/1971 | Dorn | F16N 21/04 184/105.3 |
| 3,669,220 | A * | 6/1972 | Andersson | F16N 3/12 184/105.3 |
| 3,720,289 | A * | 3/1973 | Moldenhauer | B62J 31/00 184/28 |
| 4,027,929 | A * | 6/1977 | Huddleston | F16C 33/6622 384/377 |
| 4,195,812 | A * | 4/1980 | Norcross | F16L 37/36 184/105.3 |
| 4,508,372 | A * | 4/1985 | White | F16N 21/00 285/332 |
| 4,534,449 | A * | 8/1985 | Larson | F16N 5/02 222/149 |
| 4,637,441 | A * | 1/1987 | Gomersall | F17C 13/04 141/351 |
| 5,595,262 | A * | 1/1997 | Martin | F16N 7/38 280/288.4 |
| 5,647,456 | A * | 7/1997 | Gelb | B62J 31/00 184/15.3 |
| 5,934,411 | A * | 8/1999 | Murano | F16N 13/22 184/44 |
| 6,257,369 | B1 * | 7/2001 | Pesl | B62J 31/00 184/15.3 |
| 6,902,209 | B2 * | 6/2005 | McInerney | F16N 3/12 285/353 |
| 7,935,390 | B2 * | 5/2011 | Muljono | F16H 57/05 427/482 |
| 8,757,325 | B2 * | 6/2014 | Singer | B05C 1/04 184/11.5 |
| 9,079,720 | B1 * | 7/2015 | Schmidt | F16H 57/05 |
| 11,021,331 | B2 * | 6/2021 | Rousseau | F16N 7/38 |
| 11,697,136 | B2 * | 7/2023 | Buck | C10M 169/04 134/57 R |
| 2009/0045270 | A1 * | 2/2009 | Muljono | F16H 57/0456 239/3 |
| 2009/0223745 | A1 * | 9/2009 | Marcucci | B62J 31/00 222/395 |
| 2010/0038176 | A1 * | 2/2010 | Moen | B65G 45/08 184/7.4 |
| 2013/0126305 | A1 * | 5/2013 | Hosokawa | B65G 45/08 198/500 |
| 2014/0060973 | A1 * | 3/2014 | Singer | B05C 1/04 184/15.1 |
| 2015/0115071 | A1 * | 4/2015 | Go | F16C 33/1045 204/192.1 |
| 2016/0138703 | A1 * | 5/2016 | Doran | F16H 57/05 29/428 |
| 2019/0009993 | A1 * | 1/2019 | Rousseau | F16N 13/10 |
| 2021/0046518 | A1 * | 2/2021 | Buck | B08B 5/023 |

OTHER PUBLICATIONS

Office Action received for Great Britain Patent Application No. 2318869.1, mailed on Apr. 9, 2024, 7 pages.

* cited by examiner

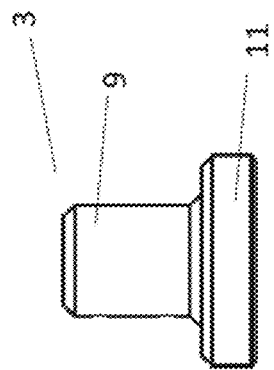
Figure 2C
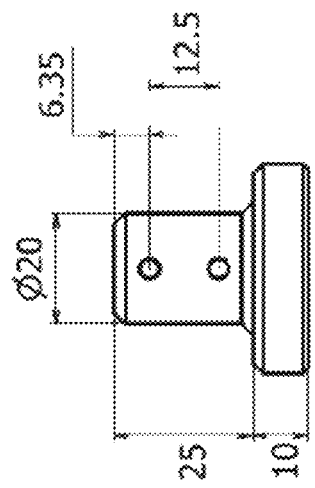
Figure 2F
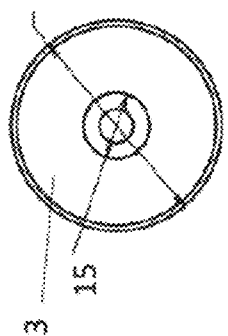
Figure 2B
Figure 2E
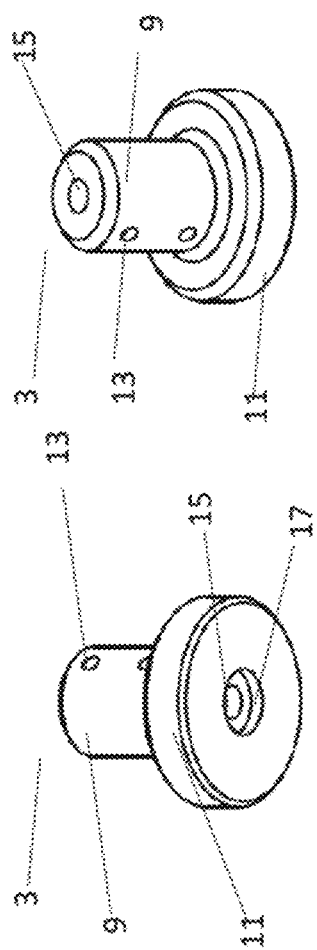
Figure 2A
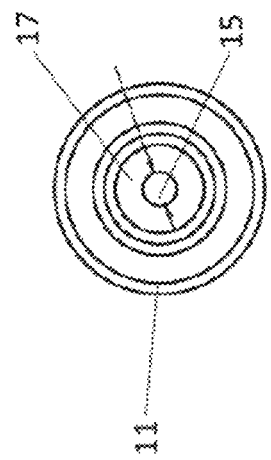
Figure 2D

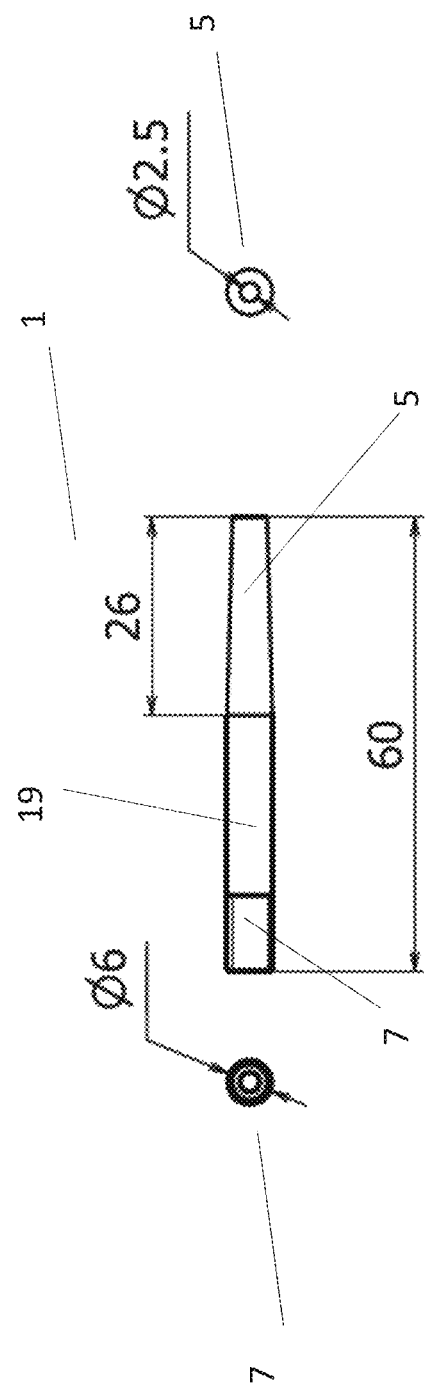

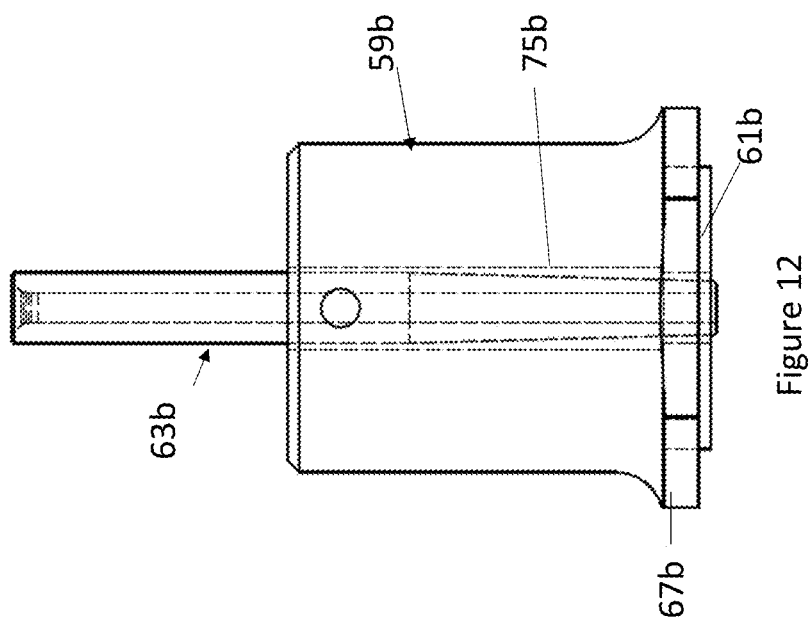

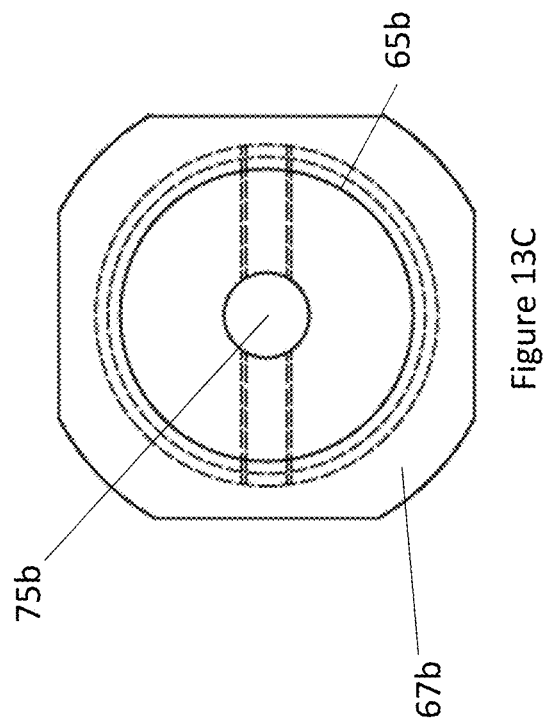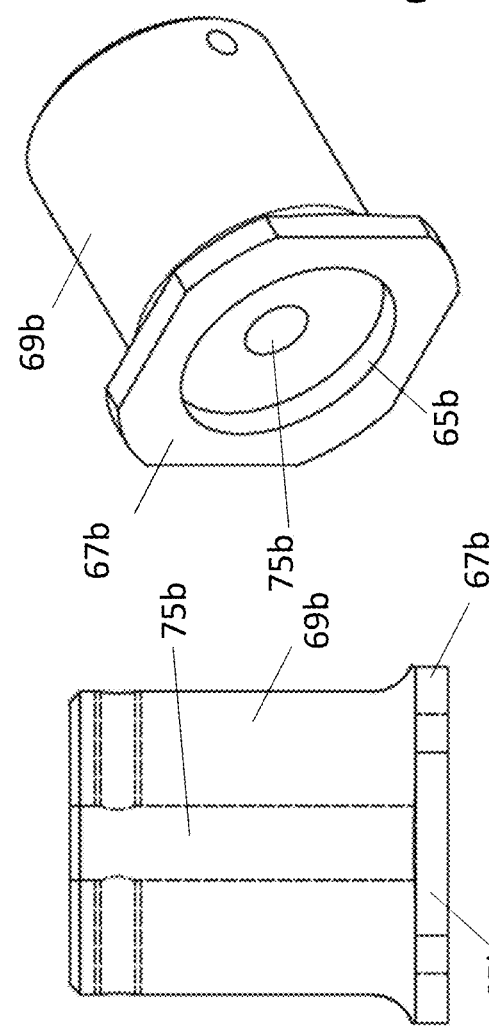

NOZZLE

CROSS-REFERENCE TO RELATED APPLICATIONS

This application claims priority to GB Patent Application Nos. 2301021.8, filed on Jan. 24, 2023 and 2318869.1, filed on Dec. 11, 2023, the disclosure of each of which is hereby incorporated by reference in their entireties.

FIELD OF INVENTION

The present application relates to the field of nozzles. More specifically the application relates to nozzles for the application of lubricant. Yet more specifically the application relates to nozzles for the application of lubricant to chains. And yet more specifically the application of lubricant to chains for use in the baking industry, for example to the application of lubricant to pin lubrication holes in chains in the baking industry.

BACKGROUND

At present there are two types of lubricants that are used to lubricate surfaces. These include graphite, or other solid lubricants, and fluid lubricants.

In the baking industry, and other similar industries, graphite is currently the preferred lubricant because it is simple to apply. The fluid lubricants may well be technically superior, but due to the problem of lack of ease of application they are often not used.

In the baking industry in some jurisdictions food standards state that lubricants should comply with the NSF H1 standard—unless they are unavailable, or not suitable. In this case H2 compliant lubricants may be used. Solid graphite based lubricants are typically H2 lubricants. Whilst some fluid, or solid suspended in fluid lubricants are H1 compliant. At present due to the difficulty of applying the H1 compliant lubricants H2 are often used. It is also advantageous that said H1 lubricants are applied sparingly as they in some instances have increased cost compared to graphite lubricants.

For example, industrial ovens in the baking industry typically produce around 10000-12000 bread products an hour. The bread products sit on a large conveyor chain (or on shelves attached to the chain) as the chain slowly moves through the oven. Aspects of the chain need lubricating to ensure that the ovens can continue to function. Said chains are very large, weighing many tons, and extending for well over 100 m in length. As the chains are moving it can be difficult to apply lubricant. In the baking industry it is therefore common to simply brush graphite along the chains. To do so the oven has to be turned off (which reduces baking output, and increases cost for cooling and heating the large oven). Additionally the ovens may be turned off so that graphite lubricants can be used—as applying these at high temperatures can cause smoke which may ruin the bread in production.

The present invention is concerned with a device for making it easy to apply lubricant, particularly fluid lubricant, to chains. This may be particularly useful in the baking industry.

It is also the aim to provide a device to allow application of lubricant in both hot or cold conditions, and/or to reduce downtime of the system, the labour cost associated with applying the lubricant, and/or increasing the chain lifespan.

SUMMARY OF THE INVENTION

Aspects of the invention are set out in the independent claims. Optional features are set out in the dependent claims.

In accordance with a first aspect of invention there is disclosed a nozzle for lubricating a chain, the nozzle comprising a nozzle tip; and a nozzle body configured to house the nozzle tip. In this aspect, the nozzle tip comprises a proximal end configured to be attached to a lubricant providing device, and a distal end configured to eject lubricant into/onto the chain; the nozzle tip further comprises a first lumen provided between the proximal end and the distal end, the lumen encased within an outer wall, wherein said lumen is configured to allow lubricant to pass therethrough; and the nozzle body comprises a second lumen or a cavity, wherein the second lumen or cavity is configured for the nozzle tip to be housed therein. Moreover, when the nozzle tip is housed within the nozzle body, the distal end of the nozzle tip is configured to protrude beyond a distal end of the nozzle body, and the proximal end of the nozzle tip is configured to protrude beyond the proximal end of the nozzle housing. Yet further, the nozzle body comprises an alignment face, wherein the alignment face is configured to align the nozzle with the chain. This may be advantageous because the alignment face may allow the user attempting to apply lubricant to easily locate the tip within the area to be reached. For example, if the user is attempting to apply lubricant to a pin lubrication hole on a chain inside an industrial oven the pin lubrication hole may be less than 5 mm in diameter, and may be over a metre away from the user. It has been found that the use of an alignment face makes it substantially simpler for the user to align the nozzle tip with the pin lubrication hole, allowing the lubricant to be applied. This reduces the rate of lubrication failure.

Optionally, further comprising a gasket and wherein the gasket is configured to be positioned around the tip. The gasket may be particularly advantageous for creating a seal around a pin lubrication hole, whilst the nozzle tip penetrates the pin lubrication hole. Without a seal around the pin lubrication hole some of the lubricant that is inserted into the hole may exit the lubrication hole out of the entrance as blowback. This can therefore reduce the efficiency of lubrication.

Optionally, wherein the gasket is a rubberised element. The rubberised nature of the gasket may aid in the creation of a seal as the nozzle tip penetrates the pin lubrication hole.

Optionally, the gasket comprising a torus which in some embodiments is advantageous for forming a seal.

Optionally, wherein the gasket comprises a third lumen configured for the nozzle tip to be housed therein. Advantageously, the third lumen may constrain the nozzle tip such that it is located in a desired central position with respect to the nozzle body and prevent movement of the nozzle tip within the nozzle body. This may be particularly useful for a user when locating the pin lubrication hole with the nozzle tip as the user may not have a direct view of the nozzle tip due to it being obstructed by the nozzle body. Such an arrangement may provide a consistent reference point that accurately communicates the location of the nozzle tip with respect to the nozzle body. This may aid in increasing accuracy of lubrication. Such an arrangement may also aid in maintaining a central nozzle position when contact is made between the nozzle tip and a belt element.

Optionally, wherein the nozzle body comprises the cavity, and wherein the gasket is configured to at least partially fill the cavity. This arrangement of internally housing the gasket within the nozzle body may reduce the probability of the gasket detaching form the nozzle body, especially when trying to locate a pin lubrication hole with the nozzle.

Optionally wherein the gasket is configured to centralise the nozzle tip within the nozzle body. Once again, the centrally held nozzle tip may aid a user when aligning the nozzle tip with the pin lubrication hole when there is no direct view of the tip.

Optionally wherein the gasket is configured to substantially fill the cavity. Such an arrangement may also allow for additional compression of the nozzle when atop the pin lubrication hole so as to achieve a tighter seal as compared to a gasket being accommodated entirely on the external side of the nozzle body. This tighter seal may minimise the risk of lubricant leakage more effectively. Such an arrangement may also allow for the cushioning of the nozzle tip along its length from the nozzle body by the gasket during the aligning procedure. This may reduce the wear on both the nozzle body and tip.

Optionally, wherein the gasket is a conical frustum in shape. Advantageously, such an arrangement may allow for greater grip with the nozzle body and therefore reduce the probability of the gasket and nozzle body detaching when moved.

Optionally wherein the gasket is formed from a test tube bung. Utilising another use for this standard part may reduce the complexity in manufacturing such a gasket.

Optionally, wherein the gasket has a depth of 5-10 mm, and optionally wherein the cavity has a depth 1 mm less than the depth of the gasket. This may ensure that a portion of the gasket protrudes from the nozzle body and is in contact with the belt portion. Beneficially, this contact would ensure that the gasket can be compressed and the desired seal achieved between nozzle and belt so as to prevent leakage of lubricant.

Optionally, wherein the gasket is a disk. Advantageously, such a shape may effectively fit around and form a seal around the nozzle tip to achieve the desired seal with minimal gasket material.

Optionally wherein the diameter of the gasket is between 10 mm and 30 mm. This may ensure a secure fit within a cavity.

Optionally, wherein the alignment face is shaped and dimensioned such that at least a portion of the perimeter of the alignment face aligns either with a slot in between a first chain plate and a second chain plate of the chain; and/or with a slot between a first roller and a second roller of the chain. Dimensioning the alignment face in this way may advantageously allow a user to easily locate the nozzle tip in the pin lubrication hole. For example, aligning the perimeter of the alignment face with the distance between the first chain plate and the second chain plate may allow a user to fit the alignment face between the chain plates and then drag the nozzle tip (for example dragging the tip along a roller) to the pin lubrication hole. This has been found to make users far more accurate and need fewer attempts at lubricating a pin lubrication hole. As the chain is moving during the lubrication process a user may only get one or two attempts to lubricate a hole per baking cycle—so accuracy is advantageous.

Optionally, wherein when the perimeter of the alignment face aligns with the slot between the first chain plate and the second chain plate, the nozzle tip is aligned with a pin lubrication hole into which the nozzle tip is configured to be placed. This may allow the lubricant to be easily inserted into the pin lubrication hole.

Optionally, wherein the alignment face is rectangular with a first length of the face larger than the second length of the face, optionally wherein the first length is configured for use with a first slot type, and the second length is configured for use with a second type of slot. Advantageously, such an arrangement enables one nozzle to be compatible with two slot types. The may reduce the number of nozzles needed and therefore reduce costs associated with their manufacture. Additionally, these lengths may be best suited to fitting between the slots with some give, but not too much that the alignment is poor.

Optionally wherein the first length is 33 mm, and further optionally wherein the second length is 34 mm. These dimensions may ensure a low tolerance fit with two industry used slot types.

Optionally, the alignment face is circular with a diameter of between 25 mm and 50 mm, optionally wherein the diameter is between 30 mm and 40 mm, and further optionally wherein the diameter is 35 mm. These diameters may be best suited to fitting between the chain plates with some give, but not too much that the alignment is poor. 35 mm has been found to be the ideal size for at least some chain types, but the ranges given above are also advantageous for this purpose.

Optionally, wherein the second lumen or cavity is central within alignment face. This may make it easier for a user to locate the pin lubrication hole with the nozzle tip.

Optionally, wherein the second lumen or cavity is central within the nozzle body. This may make the nozzle simpler to manufacture.

Optionally, wherein the nozzle body comprises two portions, the first portion comprising the alignment face, and the second portion comprising a gripping portion. This may be advantageous for several reasons. Firstly, this allows the nozzle body and the tip to be attached together such that the alignment and position of the tip relative to the body is constant (at least until it is adjusted by a user). This makes practical use of the nozzle simpler. This may also save weight as the gripping portion may be dimensioned differently to the alignment portion, and so allow the weight of the nozzle to be minimised. This is advantageous because the nozzle may be some distance away from the user, and so minimising weight makes it simpler to use.

Optionally, wherein the first portion and second portion are stepped, such that the first portion and second portion have different radii. This allows the alignment portion to be dimensioned for its alignment function, whilst allowing the width of the gripping portion to be minimised. This allows the weight of the nozzle to be reduced.

Optionally, wherein the radius of the first portion is greater than the radius of the second portion. This allows the gripping portion to be low mass.

Optionally, the first portion and the second portion are cylindrical. This may make manufacture of the nozzle body a simple process that does not require specialist tooling.

Optionally, wherein the gripping portion comprises at least one gripping lumen substantially perpendicular to the second lumen, wherein the gripping lumen is configured to house a grub screw. This may allow the nozzle tip and the nozzle body to be adjustably attached to one another. A grub screw may also allow the position of the nozzle tip to be adjusted. For example, the nozzle tip may wear during use over time, and the tip may then be adjusted so that a greater proportion of the nozzle tip is then situated distally of the distal end of the nozzle body.

Optionally, comprising at least two gripping lumens. This may more securely constrain the nozzle tip within the second lumen.

Optionally, the nozzle tip is tapered. This may make it easier to insert the nozzle tip into the pin lubrication hole.

Optionally, the distal end of the nozzle tip is tapered. This may make it easier to insert the nozzle tip into the pin lubrication hole, without sacrificing the strength of majority of the nozzle tip.

Optionally, the distal end of the nozzle tip forms a conical frustum. This may allow lubricant to exit out of the top of the conical frustum.

Optionally, wherein the nozzle tip and the gasket are joined by a friction fit.

Optionally wherein the nozzle tip is friction fit within the third lumen of the gasket. The fit described in the above two statements may allow for an easy to adjust attachment between the two elements that may be beneficial when one (or both) component wear in use and need repositioning within the nozzle body. Friction fitting the tip of the nozzle in this third lumen may enable a user with a direct view of the attachment when assembling. This may make the process easier.

Optionally, the alignment face comprises an indent to house the gasket. This may be highly advantageous. Without the use of the indent the nozzle would still function, but it would be markedly more difficult to use. For example, the indent allows the gasket to sit at least partially within the nozzle body. This means that the distance between the end of the gasket and the end of the nozzle tip can be increased (so that the nozzle tip can penetrate further into the pin lubrication hole) without increasing the distance between the distal end of the nozzle body and the distal end of the nozzle tip (which may make insertion more difficult). This feature may also mean that less force is required by the user to compress the gasket to form a seal around the pin lubrication hole, and so reduce the chance of lubricant blowback during use.

Optionally, the indent is positioned centrally on the alignment face, and around the second lumen. This may make the nozzle simpler to use and align with the pin lubrication hole.

Optionally wherein the gasket is a disk. This gasket shape fits well around the nozzle tip and may be dimensioned such that it doesn't protrude beyond the tip. It provides the desired separation between nozzle body and the pin lubrication hole.

Optionally, the proximal end of the nozzle tip comprises an attachment means, optionally a screw thread. This may allow the nozzle tip to be attached to the lubricant providing means.

Optionally, the distal end of the nozzle tip comprises one or more castellations. In some embodiments this may allow lubricant to exit from the sides of the nozzle tip—if for example the nozzle tip is pressed flush to the base of the pin lubrication hole.

Optionally, wherein adjacent the end of the nozzle tip is an indent, wherein the indent is configured to house the gasket, and wherein the nozzle body comprises the second lumen. This may keep the gasket in a pre-selected position so that it does not move during use.

Optionally, wherein the gasket is configured such that in use when the nozzle tip is pressed within the pin lubrication hole of the chain, the surface of the gasket is compressed around the pin lubrication hole, so as to form a seal around the pin lubrication hole. This may be advantageous for preventing blowback of lubricant out of the pin lubrication hole.

Optionally, the gasket is an O-ring. This may reduce the cost of producing the nozzle.

Optionally, wherein the gasket is formed from fluororubber or heatproof silicone. This may advantageously make the nozzle well suited to be using in a high temperature environment such as an industrial oven.

Optionally, wherein into/onto the chain comprises into a pin lubrication hole situated on the chain. This may allow the pin lubrication hole to be lubricated. This may lubricate the pin-which may join the chain to a shelf element that houses the bread products in the oven, and therefore enable the pin to pivot without causing friction and wear. This may also prevent the chain or pivot from seizing up.

Optionally, the pin lubrication hole is used for connection with an external element. This may for example be a shelf, such as a baking shelf.

Optionally, the chain is a chain within an oven.

Optionally, wherein the distal end of the nozzle tip is configured to fit within the pin lubrication hole. This may ensure that the lubricant enters the pin lubricant hole.

In accordance with a second aspect of invention there is disclosed a nozzle for lubricating a chain, the nozzle comprising: a nozzle tip; and a nozzle body configured to house the nozzle tip; where the nozzle tip comprises a proximal end configured to be attached to a lubricant providing device, and a distal end configured to eject lubricant into/onto the chain; the nozzle tip further comprises a first lumen provided between the proximal end and the distal end, the lumen encased within an outer wall, wherein said lumen is configured to allow lubricant to pass therethrough; and the nozzle body comprises a second lumen or cavity, wherein the second lumen or cavity is configured for the nozzle tip to be housed therein. Moreover, when the nozzle tip is housed within the nozzle body, the distal end of the nozzle tip is configured to protrude beyond a distal end of the nozzle body, and the proximal end of the nozzle tip is configured to protrude beyond the proximal end of the nozzle housing. Moreover, a gasket is provided, wherein a surface of the gasket is configured to be compressed around a pin lubrication hole of the chain, so as to form a seal around the pin lubrication hole. In use this compressibility of the gasket may aid the user in being able to press the nozzle tip into the lubrication hole whilst having the nozzle tip cushioned by the gasket to prevent wear. Further, as lubricant is provided within the hole the gasket may prevent back flow of lubricant out of the hole, and therefore aids with minimising wastage. The overuse of lubricant is real problem in some industries as it can coat the internal mechanism, which over time can lead to blackening and detritus being formed. For example in the baking industry this is best minimised.

Optionally, the features of the first aspect may be combined with those of the second aspect. The optional features may be combined with the second aspect without the features set out explicitly in the first aspect above.

Optionally, the gasket comprising a torus. Advantageously, the gasket being torus shaped allows it to sit around the distal end of the tip.

Optionally, the gasket is positioned at the distal end of the tip by a friction fit. This may be advantageous as the tip is worn through use the gasket may be positioned slightly further down the tip so as to prolong the life of the tip.

Optionally, the gasket may be positioned at the distal end of the tip, but not at the very end of the tip. This may advantageously leave the extremity of the distal tip to be placed in the lubrication hole.

Optionally, the outer diameter of the gasket is twice to four times the inner diameter of the gasket, and preferably wherein the outer diameter is three times the inner diameter of the gasket. Advantageously, this may allow sufficient surface area to prevent back flow.

Optionally, the gasket may be 4 mm thick (when not compressed). Advantageously, this may offer sufficient resistance to the user when positioning the tip within the lubrication hole.

In accordance with a third aspect of invention, there is provided a kit of parts comprising the nozzle of any preceding aspect, and a lubricant providing device. This may provide the advantages of the above aspects, and provide lubricant into the lubrication hole.

Optionally, further comprising lubricant, optionally wherein the lubricant is perfluorolube, optionally wherein the lubricant is CL1800, optionally wherein the lubricant is CL1800F1. The use of a fluid, or fluid like, lubricant is highly advantageous for injection into the hole, as this addresses problems associated with the provision of graphite as is standard practice in many industries such as the baking industry. The particular lubricants set out above are particularly well suited to such applications and for administration by the nozzle.

Optionally, further comprising a chain. This may allow the goods to be conveyed.

In accordance with a fourth aspect on invention there is disclosed a method of lubricating a chain, said chain comprising a first chain plate, a second chain plate and a slot between the first and second chain plates, and a pin lubrication hole, the method comprising: aligning the perimeter of the alignment face with either the first and second chain plates, or the first and second rollers; inserting the nozzle tip into the pin lubrication hole; delivering a quantity of lubricant; withdrawing the nozzle tip. This may be advantageous for lubricating chains, particularly those in constant use, such as those in the baking industry.

Optionally, wherein aligning the perimeter of the alignment face with the first and second chain plates comprises placing the distal end of the nozzle tip on a first roller adjacent a slot between the first and second chain plates, and dragging the nozzle tip to the slot, such that the alignment face is aligned with the first and second chain plates. This may make use of the nozzle particularly simple for the user and result in a lower failure rate. As chains are often in constant use if there is a failure to lubricate a pin lubrication hole it can often take a large period of time for there to be another opportunity to do so (up to an hour in some cases). Therefore reducing failure rates of lubrication is highly beneficial.

Optionally, further comprising compressing the gasket to form a seal around the pin lubrication hole as/after the nozzle tip is inserted. This may reduce the amount of backflow of lubricant, reducing wastage.

Optionally, wherein the quantity of lubricant is a predetermined quantity. This may reduce the amount of wastage whilst providing sufficient lubrication.

Optionally, wherein the nozzle is the nozzle of any of the first and second aspect.

In accordance with a fifth aspect there is provided a nozzle for lubricating a chain, the nozzle comprising a nozzle tip; and a nozzle body configured to house the nozzle tip; wherein the nozzle tip comprises a proximal end configured to be attached to a lubricant providing device, and a distal end configured to eject lubricant into/onto the chain; the nozzle tip further comprises a first lumen provided between the proximal end and the distal end, the lumen encased within an outer wall, wherein said lumen is configured to allow lubricant to pass therethrough; the nozzle body comprises a second lumen, wherein the second lumen is configured for the nozzle tip to be housed therein; wherein when the nozzle tip is housed within the nozzle body the distal end of the nozzle tip is configured to protrude beyond a distal end of the nozzle housing, and the proximal end of the nozzle tip is configured to protrude beyond the proximal end of the nozzle housing; the nozzle body comprises an alignment face, wherein the alignment face is configured to align the nozzle with the chain. This may be advantageous because the alignment face may allow the user attempting to apply lubricant to easily locate the tip within the area to be reached. For example, if the user is attempting to apply lubricant to a pin lubrication hole on a chain inside an industrial oven the pin lubrication hole may be less than 5 mm in diameter, and may be over a metre away from the user. It has been found that the use of an alignment face makes it substantially simpler for the user to align the nozzle tip with the pin lubrication hole, allowing the lubricant to be applied. This reduces the rate of lubrication failure.

Optionally, further comprising a gasket, the gasket comprising a torus, and wherein the gasket is configured to be positioned at the distal end of the tip. The gasket may be particularly advantageous for creating a seal around a pin lubrication hole, whilst the nozzle tip penetrates the pin lubrication hole. Without a seal around the pin lubrication hole some of the lubricant that is inserted into the hole may exit the lubrication hole out of the entrance as blowback. This can therefore reduce the efficiency of lubrication.

Optionally, the gasket is a rubberised torus. The rubberised nature of the gasket may aid in the creation of a seal as the nozzle tip penetrates the pin lubrication hole.

Optionally, the alignment face is circular with a diameter of between 25 mm and 50 mm, optionally wherein the diameter is between 30 mm and 40 mm, and further optionally wherein the diameter is 35 mm. These diameters may be best suited to fitting between the chain plates with some give, but not too much that the alignment is poor. 35 mm has been found to be the ideal size for at least some chain types, but the ranges given above are also advantageous for this purpose.

Optionally, the second lumen is central within alignment face. This may make it easier for a user to locate the pin lubrication hole with the nozzle tip.

Optionally, the second lumen is central within the nozzle body. This may make the nozzle simpler to manufacture.

Optionally, the first portion and the second portion are cylindrical. This may make manufacture of the nozzle body a simple process that does not require specialist tooling.

Optionally, the alignment face comprises an indent to house the gasket. This may be highly advantageous. Without the use of the indent the nozzle would still function, but it would be markedly more difficult to use. For example, the indent allows the gasket to sit at least partially within the nozzle body. This means that the distance between the end of the gasket and the end of the nozzle tip can be increased (so that the nozzle tip can penetrate further into the pin lubrication hole) without increasing the distance between the distal end of the nozzle body and the distal end of the nozzle tip (which may make insertion more difficult). This feature may also mean that less force is required by the user to compress the gasket to form a seal around the pin lubrication hole, and so reduce the chance of lubricant blowback during use.

Optionally, the indent is positioned centrally on the alignment face, and around the second lumen. This may make the nozzle simpler to use and align with the pin lubrication hole.

Optionally, the nozzle tip and the gasket are joined by a friction fit. This may allow the gasket to be repositioned as the nozzle tip is repositioned within the nozzle body due to wear.

Optionally, adjacent the end of the nozzle tip is an indent, wherein the indent is configured to house the gasket. This may keep the gasket in a pre-selected position so that it does not move during use.

Optionally, the gasket is configured such that in use when the nozzle tip is pressed within the pin lubrication hole of the chain, the gasket is compressed around the pin lubrication hole, so as to form a seal around the pin lubrication hole. This may be advantageous for preventing blowback of lubricant out of the pin lubrication hole.

Optionally, the gasket is an O-ring. This may reduce the cost of producing the nozzle.

Optionally, wherein the gasket is formed from fluoro-rubber. This may advantageously make the nozzle well suited to be using in a high temperature environment such as an industrial oven.

In accordance with a sixth aspect there is provided a nozzle for lubricating a chain, the nozzle comprising a nozzle tip; and a nozzle body configured to house the nozzle tip; wherein the nozzle tip comprises a proximal end configured to be attached to a lubricant providing device, and a distal end configured to eject lubricant into/onto the chain; the nozzle tip further comprises a first lumen provided between the proximal end and the distal end, the lumen encased within an outer wall, wherein said lumen is configured to allow lubricant to pass therethrough; and the nozzle body comprises a second lumen, wherein the second lumen is configured for the nozzle tip to be housed therein. Moreover, when the nozzle tip is housed within the nozzle body, the distal end of the nozzle tip is configured to protrude beyond a distal end of the nozzle housing, and the proximal end of the nozzle tip is configured to protrude beyond the proximal end of the nozzle housing. In addition, a gasket is provided comprising a torus, and the gasket is configured to be positioned at the distal end of the tip.

Advantageously, the gasket being torus shaped allows it to sit around the distal end of the tip. In use this may aid with the user being able to press the tip into the lubrication hole and this action being both cushioned by the gasket to prevent wear. Further as lubricant is provided within the hole the gasket may prevent back flow of lubricant out of the hole, and therefore aids with minimising wastage. The overuse of lubricant is real problem in some industries as it can coat the internal mechanism, which over time can lead to blackening and detritus being formed. For example in the baking industry this is best minimised.

Optionally, the features of the first aspect may be combined with those of the second aspect. The optional features may be combined with the second aspect without the features set out explicitly in the first aspect above.

Optionally, the gasket is positioned at the distal end of the tip by a friction fit. This may be advantageous as as the tip is worn through use the gasket may be positioned slightly further down the tip so as to prolong the life of the tip.

Optionally, the gasket may be positioned at the distal end of the tip, but not at the very end of the tip. This may advantageously leave the extremity of the distal tip to be placed in the lubrication hole.

Optionally, the outer diameter of the gasket is twice to four times the inner diameter of the gasket, and preferably wherein the outer diameter is three times the inner diameter of the gasket. Advantageously, this may allow sufficient surface area to prevent back flow.

Optionally, the gasket may be 4 mm thick (when not compressed). Advantageously, this may offer sufficient resistance to the user when positioning the tip within the lubrication hole.

BRIEF DESCRIPTION OF DRAWINGS

FIGS. 2A-2F show the nozzle body from several viewpoints. The measurements shown are optional.

FIGS. 3A-3C show the nozzle tip from various viewpoints. The measurements shown are optional.

FIG. 12 shows a third embodiment of the present invention, comprising a rectangular nozzle body with a central lumen.

FIGS. 13A-13C show the rectangular nozzle body of the third embodiment from several viewpoints.

DETAILED DESCRIPTION

Aspects are set out in the independent claims. Optional features are set out in the dependent claims.

Figure 1:
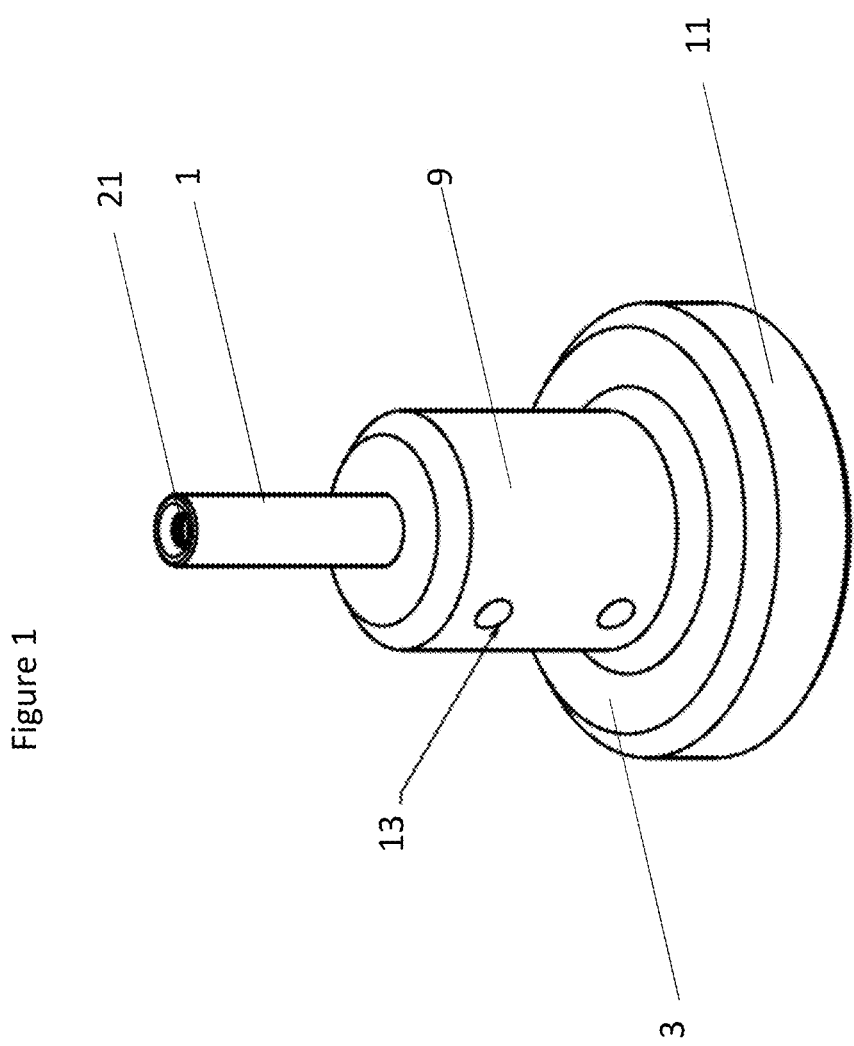
FIG. 1 shows a first embodiment of the present invention, comprising a nozzle body and a nozzle tip.

FIG. 1 shows a nozzle for lubricating a chain, the nozzle comprising: a nozzle tip; a nozzle body configured to house the nozzle tip; the nozzle tip comprising a proximal end configured to be attached to a lubricant providing device, and a distal end configured to eject lubricant into/onto the chain; the nozzle tip further comprising a first lumen provided between the proximal end and the distal end, the lumen encased within an outer wall, wherein said lumen is configured to allow lubricant to pass therethrough; the nozzle body comprising a second lumen, wherein the second lumen is configured for the nozzle tip to be housed therein; wherein when the nozzle tip is housed within the nozzle body the distal end of the nozzle tip is configured to protrude beyond a distal end of the nozzle housing, and the proximal end of the nozzle tip is configured to protrude beyond the proximal end of the nozzle housing; the nozzle body comprising an alignment face, wherein the alignment face is configured to align the nozzle with the chain.

FIG. 1 shows a nozzle for lubricating a chain. The nozzle comprises the nozzle tip 1, and the nozzle body 3. A first lumen 21 is shown at the end of the nozzle tip. This lumen extends through the nozzle tip. The end of the nozzle tip shown is the proximal end 7. This is the end that is configured to receive lubricant from a lubricant providing device. This is not the end that is configured to eject lubricant (although it could be used for this purpose in some embodiments).

The nozzle body 3 is shown as comprising a first portion 11 (known as the alignment portion), and a second portion 9 (known as the gripping portion). The radius of the first portion is greater than the radius of the second portion. This creates a step between the first portion 11 and the second portion 9. Additionally, both the first portion 11 and the second portion 9 are cylindrical. FIG. 1 also shown the griping lumen 13. FIG. 1 shows two gripping lumens, but one gripping lumen, or multiple gripping lumens may be used. The gripping lumen is configured to house a grub screw. A grub screw situated in the gripping lumen 13 would make contact with the nozzle tip 1 within the nozzle body 3. The grub screw may therefore secure the nozzle tip 1 within the nozzle body 3. Multiple gripping lumens 13 (such as the two shown) may improve the longevity of the connection between the nozzle body 3 and the nozzle tip 1. It is noted that the second portion 9 (and the gripping lumen 13) are optional features that may be removed from the nozzle in certain embodiments—particularly those where weight is to be reduced.

FIGS. 2A-2F show the nozzle body from several viewpoints. The measurements shown are optional. FIG. 2A shows a perspective view of the nozzle body 3, angled from below. This shows the first portion 11, the second portion 9, and that the first portion 11 has a larger radius, with a step between the two portions. The gripping lumens 13 are also shown. Additionally the alignment face of the first portion is shown. This is shown as the bottom face of the nozzle body 3. Central in the alignment face is the second lumen 15. This is the lumen 15 that is configured to house the nozzle tip 1. There is also an indent 17 positioned centrally on the alignment face. The indent 17 is configured to at least partially house a gasket. This enables the gasket to sit around the distal end of the nozzle tip 1 as the nozzle tip protrudes form the nozzle body 3. The indent 17 may have a depth that is less than the depth of the gasket so that the gasket protrudes above the alignment face. This may allow the gasket to be compressed as the nozzle tip 1 is positioned within the pin lubrication hole.

The alignment face is configured to aid alignment of the nozzle. Chains typically comprise a pin with a pin lubrication hole, where the pin sits between two rollers. Either side of the rollers and the pin sit a first and second chain plate. The alignment face is dimensioned such that at least a portion of the perimeter of the alignment face aligns with either the gap between the first chain plate and the second chain plate, or the gap between the first and second rollers. In FIG. 2A the alignment face is circular. The diameter of the alignment face may therefore be the same as the distance between the two rollers (at a height above the pin lubrication hole, where said height is equal to the penetration depth of the nozzle tip). Alternatively, the diameter of the alignment face may be equal to the distance between the first and second chain plates.

In embodiments where the alignment face is circular it may have a diameter of between 25 mm and 50 mm, optionally wherein the diameter is between 30 mm and 40 mm, and further optionally wherein the diameter is 35 mm.

35 mm may allow for alignment with the majority of legacy chains in industrial ovens, particular in use in North America.

FIG. 2B is a further perspective view of the nozzle body 3, angled from above. Therefor the top of the second portion 9 is shown. This comprises the other end of the second lumen 15 that is configured to house the nozzle tip 1.

FIG. 2C is a side view of the nozzle body 3. This shows the first portion 11 and the second portion 9.

FIG. 2D shows a plan view of the nozzle body 3 from below. This shows the alignment face. This shows the second lumen 15, and the indent 17. The first portion 11 is also shown. In use, as the alignment face is aligned with the first and second roller, or the first and second chain plates the nozzle tip is the correspondingly aligned with the pin lubrication hole—therefore enabling ease of use for the user. In practice (as the chain is moving) the user will often find it easier to place the alignment face on a first roller and drag the alignment face along the first roller until it comes into contact with the second roller. At this point the alignment face will have aligned the nozzle tip 1 with the pin lubrication hole. This therefore may reduce the number of lubrication failures significantly.

FIG. 2E shows a plan view of the nozzle body from above. In particular, the second lumen 15 is shown as is the upper face of the second portion.

FIG. 2F shows a side view with optional measurements displayed. The depth of the first portion is shown as being 10 mm. The depth of the second portion is shown as being 25 mm. In many embodiments in which both the first and second portions are present the second portion 9 is deeper than the first portion 11. The centre of the two gripping lumens are shown to be 12.5 mm away from each other. In many embodiments in which two gripping lumens are used the gripping lumens are situated at the first and third quartiles down the second portion 9. The distance between the two gripping lumens 13 is therefore often half of the depth of the second portion 9. 6.35 mm is shown as the distance to the top of the second portion 9 from the upper gripping lumen 13. This may be approximately half of the distance between the two gripping lumens. The diameter of the top of the second portion is shown to be 20 mm.

FIGS. 3A-3C show the nozzle tip from various viewpoints. The measurements shown are optional. FIG. 3a shows a plan view from below of the very proximal end of the nozzle tip 1. The proximal end 7 is that used to attach to a lubricant providing device (often through a screw thread or equivalent). The very proximal end shown in FIG. 3a is the most proximal portion of the proximal end 7 of the nozzle tip 1. This has a diameter of 6 mm in FIG. 3a (although other diameters could be used). The first lumen is also shown in the centre of the nozzle tip. This is the lumen that is configured to transport lubricant through the nozzle tip.

FIG. 3B shows a side view of the nozzle tip. This show the proximal end 7, the middle portion 19, and the distal end 5. It is noted that the middle portion 19 is optional. The proximal end 7 may be used for attachment to a lubricant providing device. The lubricant may then travel through a lumen from the proximal end 7 through the middle portion 19, to the distal end 5, where it exits the distal end 5 at the very distal end shown in FIG. 3C. The proximal end 7 may comprise a screw thread or any other attachment means. Alternatively, the proximal end may attach via a friction fit to a lubricant providing device. The distal end 5 is a conical frustum in shape. The diameter of the distal end 5 tapers towards the very distal end. This may allow for greater precision by a user in positioning the distal end in the pin lubrication hole, and therefore reducing the lubrication failure rate. The middle portion is shown as being cylindrical, however the taper may extend all the way to the proximal end 7. Alternatively, the entire nozzle tip 1 may be cylindrical in shape.

In alternative embodiments the very end of the distal end of the nozzle tip may comprise one or more castellations. This may aid with the lubricant exiting the end of the nozzle tip without the build-up of pressure.

Additionally or alternatively adjacent the end of the nozzle tip may be an indent. Said indent may be configured to house the gasket so that a friction fit is not relied upon.

FIG. 3C shows a plan view from above of the very distal end of the nozzle tip 1. This has an internal diameter of 2.5 mm and an external diameter of less than 6 mm.

Figure 4D:
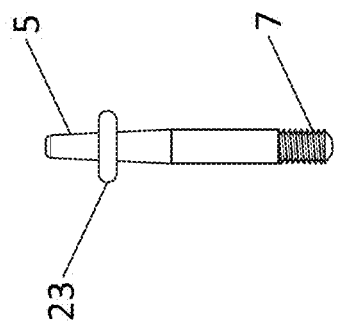
FIG. 4D shows the gasket in use with only the nozzle tip.
Figure 4C:
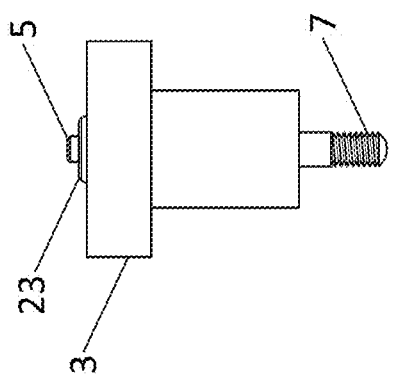
FIG. 4C shows the gasket in use with the nozzle tip and the nozzle body.
Figure 4B:
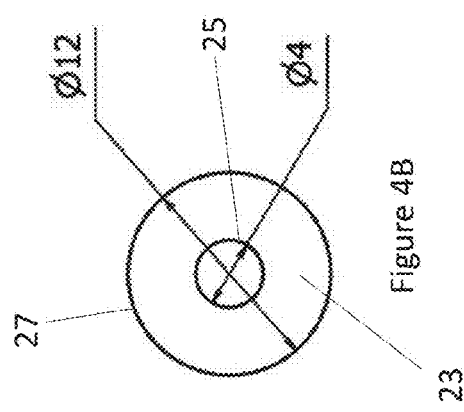
FIGS. 4A and 4B show the gasket from a side view and a plan view. The measurements shown are optional.
Figure 4A:
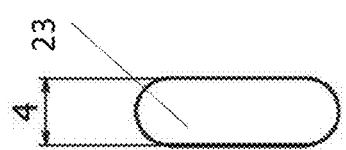

FIG. 4A shows a gasket 23 from a side view. A gasket may be used in conjunction with the nozzle to reduce back flow of lubricant, and to reduce wear of the nozzle tip 1. This may be achieved as the gasket 23 is compressed as the distal end 5 of the nozzle tip 1 is positioned within the pin lubrication hole. As the nozzle tip enters the hole the gasket may be compressed as the user pushes the tip in. This compression widens and flattens the gasket. The act of compression may reduce the force and wear on the very distal end of the nozzle tip 1. The widening of the gasket 23 may form a seal around the pin lubrication hole, preventing back flow of the lubricant out of the pin lubrication hole. The gasket 23 is shown as being 4 mm deep in FIG. 4A. Other depths may also be used. The gasket may be formed from any suitable material such as fluoro-rubber. This has properties to withstand heat (such as in industrial baking ovens) without depredation, and has a sufficient frictional constant for a friction fit with the nozzle tip 1. The gasket may be an O-ring.

FIG. 4B shows the gasket 23 from a plan view. The measurements shown are optional. The plan view shows that the gasket 23 being in a torus shape. This allows the gasket 23 to fit around the distal end 5 of the nozzle tip 1. The gasket 23 and the nozzle tip may be joined by a friction fit. The inner diameter 25 of the gasket 23 may be 4 mm. This may allow the gasket 23 to be pushed a selectable distance down the distal end 5 of the nozzle tip 1. Therefore as the nozzle tip 1 wears the gasket can be pushed further down the distal end 5 of the nozzle tip 1 so that the lifetime of the nozzle is increased. As the gasket 23 is stretchable this inner diameter may be enlarged or stretched somewhat as the gasket 23 is pushed to a larger diameter of the distal end 5 of the nozzle tip 1 (in embodiments in which the distal end 5 is conical in shape). The outer diameter 27 of the gasket 23 is 12 mm in this embodiment. This may correspond with the diameter of an indent on the alignment face of the nozzle body 3.

FIG. 4C shows the gasket in use with the nozzle tip and the nozzle body. This shows the nozzle body 3 (comprising the first portion and the second portion), the proximal end 7 of the nozzle tip 1, the distal end 5 of the nozzle tip 1, and the gasket 23. The gasket is positioned at the distal end of the nozzle body. The gasket 23 is positioned abutting the alignment face of the nozzle body 3. In this instance the gasket 23 is partially sunken in the indent 17 on the alignment face such that only a portion of the depth of the gasket 23 rise above the alignment face. It is noted that the indent is optional, and instead the entire gasket may sit above the alignment face in alternative embodiments. It is noted that in this embodiment the gasket does not sit at the very end of the distal end of the nozzle tip. This is so that the very distal end of the nozzle tip can penetrate the pin lubrication hole.

FIG. 4D shows the gasket in use with only the nozzle tip. In other embodiments the nozzle body may not be used. The nozzle body is primarily for alignment and for uses where alignment is not as much of a problem (for instance where the pin lubrication holes are closer and more accessible) this simpler nozzle may be used. The nozzle tip is as described with relation to FIG. 3, and the gasket is as described with relation FIGS. 4A and 4B. The nozzle therefore comprises the nozzle tip 1 and the gasket 23. The gasket 23 is positioned at the distal end 5 (but not the very distal end in this embodiment) of the nozzle tip 1. This arrangement may be housed within the nozzle body in some embodiments.

Figure 5:
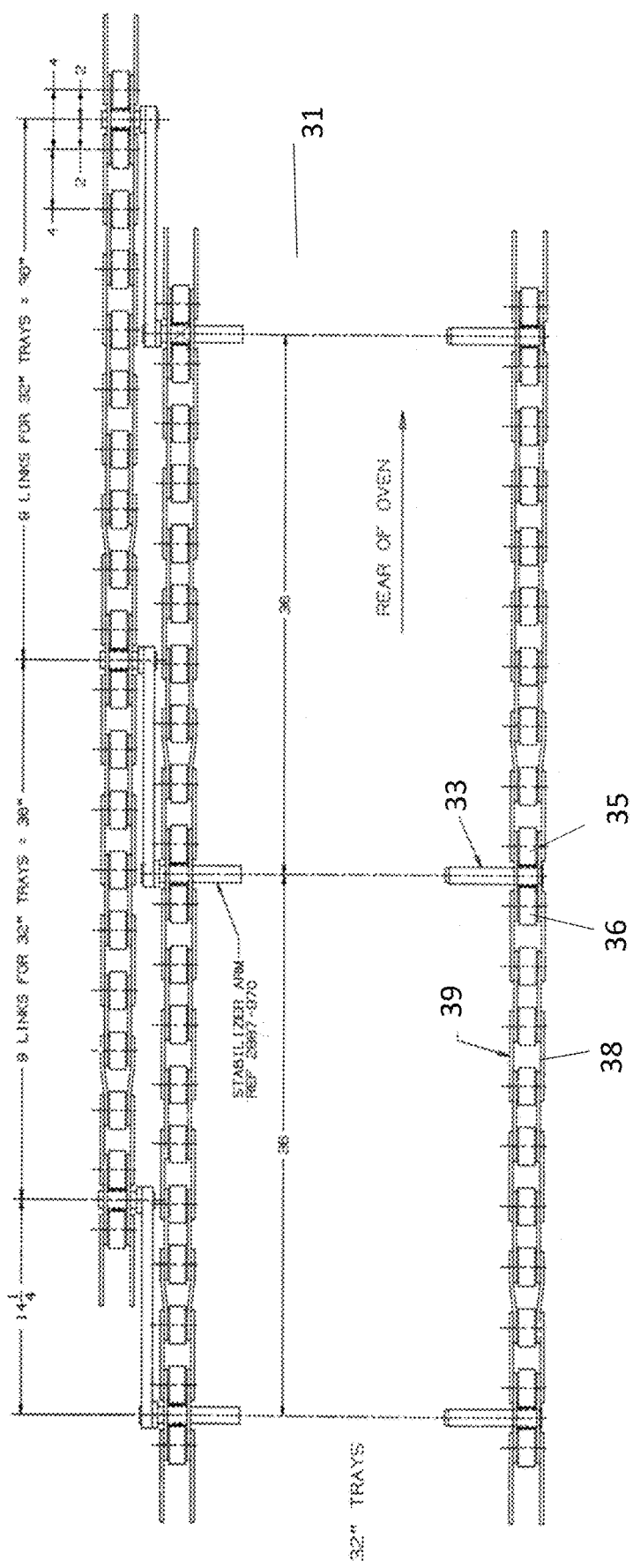
FIG. 5 shows a plan view of a chain that may be used in conjunction with the nozzle.

FIG. 5 shows a plan view of a chain that may be used in conjunction with the nozzle as described above and that as will be described in FIGS. 8 to 15. The chain 31 may be used for transporting any sort of goods for a variety of applications. For example, the chain may be used in a manufacturing line. In one particular example the chain is used in an industrial oven, such as that used to make bread products, such as loaves or rolls. The chain is configured to move through the oven so that the bread products receive the pre-determined amount of baking to ensure consistent production of goods. The stabilizer arm shown in FIG. 5 attaches the chain to a tray that is often used to carry the baked goods. The stabilizer arm is attached to the chain via the pin 33. The pin is connected between the first roller 35 and the second roller 36. A portion of the pin is positioned between a first chain plate 38 and a second chain plate 39 (for clarity other chain plates are highlighted by reference numerals 38, 39—but the same structure is in place around the pin 33). It is noted that chains can weigh many tons, and are formed from metal. They can be up to 120 m long (or potentially longer) and so take a great deal of time to complete one rotation.

Figure 6:
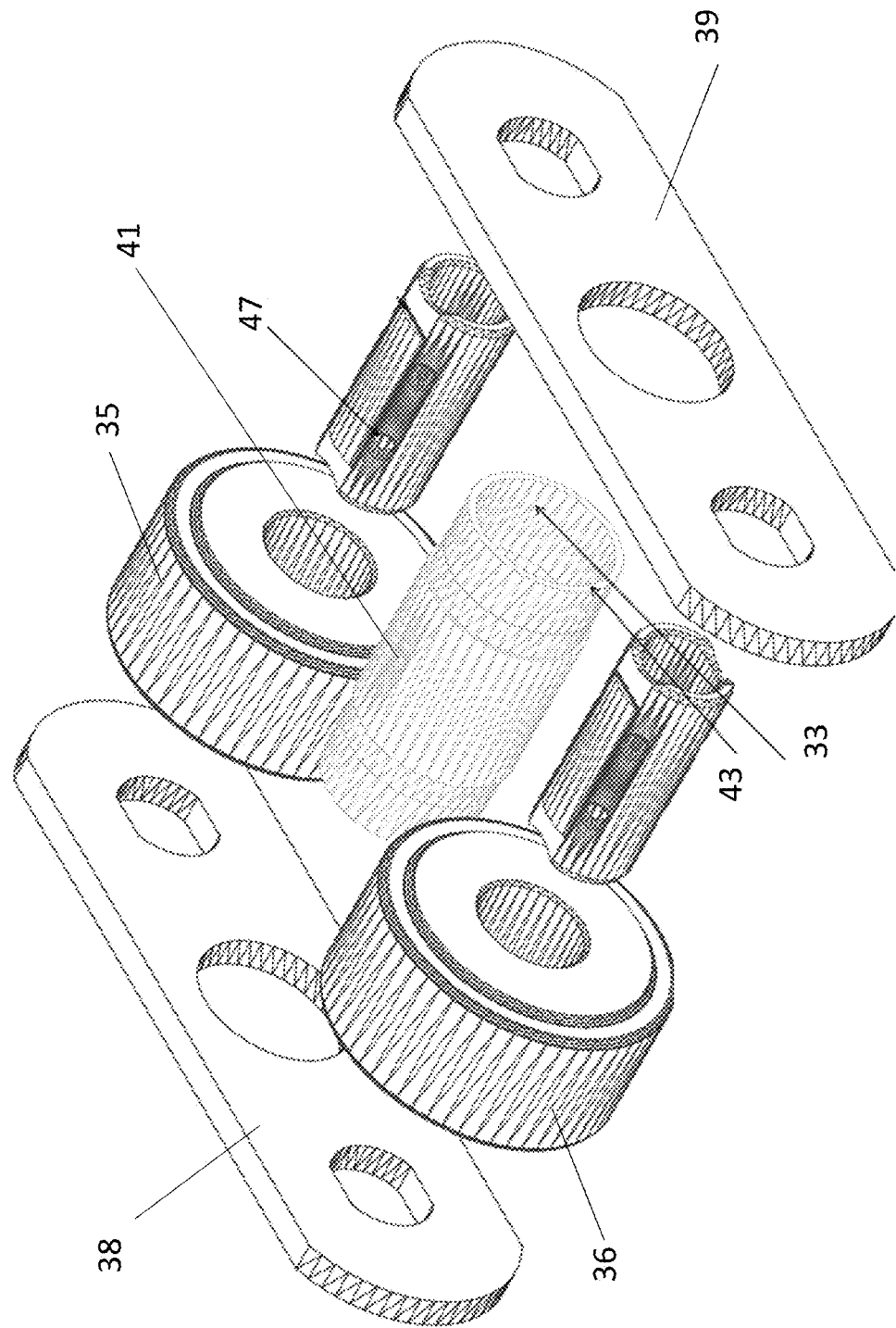
FIG. 6 shows an exploded view of one section of the chain of FIG. 5.

FIG. 6 shows an exploded view of one section of the chain of FIG. 5. This shows the structure around the portion of the pin between the first and second rollers 35, 36.

FIG. 6 shows a first chain plate 38, a second chain plate 39, a first roller 35, a second roller 36, the pin 33, the axle 47 of the roller 35. The pin comprises an outer shell 43, and a pin lubrication hole 41.

The first chain plate 38 and the second chain plate 39 are positioned either side of the first roller 35 and second roller 36. Axles 47 are positioned inside the inner circumference of the rollers. The axles are connected to the outer holes of the first and second chain plates. The pin 33 passes through the central holes of the first and second chain plates. The pin 33 may terminate at one of the chain plates, and may extend through the other. The pin and rollers may each pivot relative to one another.

The pin 33 however requires lubrication. The pin hole 41 allows lubricant to enter the pin. In some embodiments the pin is hollow (as shown by other shell 43) and lubricant may therefore pass into the pin.

At present graphite is brushed into the pin lubrication hole. However, this leaves detritus in the apparatus, and is often unsuccessful as the pin lubrication hole is difficult to access. This is also wasteful as excess graphite is commonly used.

The nozzle shown above allows the nozzle tip 1 to enter the pin lubrication hole 41. The nozzle can then inject lubricant into the pin lubrication hole. In some embodiments the lubricant for use with the nozzle is a fluid lubricant. This may for instance be perfluorolube. In some embodiments this may in particular be CL1800, and in particular CL1800F1. These lubricants can be used at high temperatures such as in industrial ovens or bakeries. They are also save for use in situations in which food for human consumption is being prepared. They may also allow the frequency of lubrication to be reduced as the fluid nature of these lubricants may ensure they are longer lasting in the apparatus.

A kit may include the nozzle described above and that described in FIGS. 8 to 15. This may be in combination with either a lubricant as described above, or with a lubricant providing device (or both). Alternatively, or additionally the chain may also be contained in the kit of parts and be used with the nozzle as described in FIGS. 8 to 15.

Figure 7:
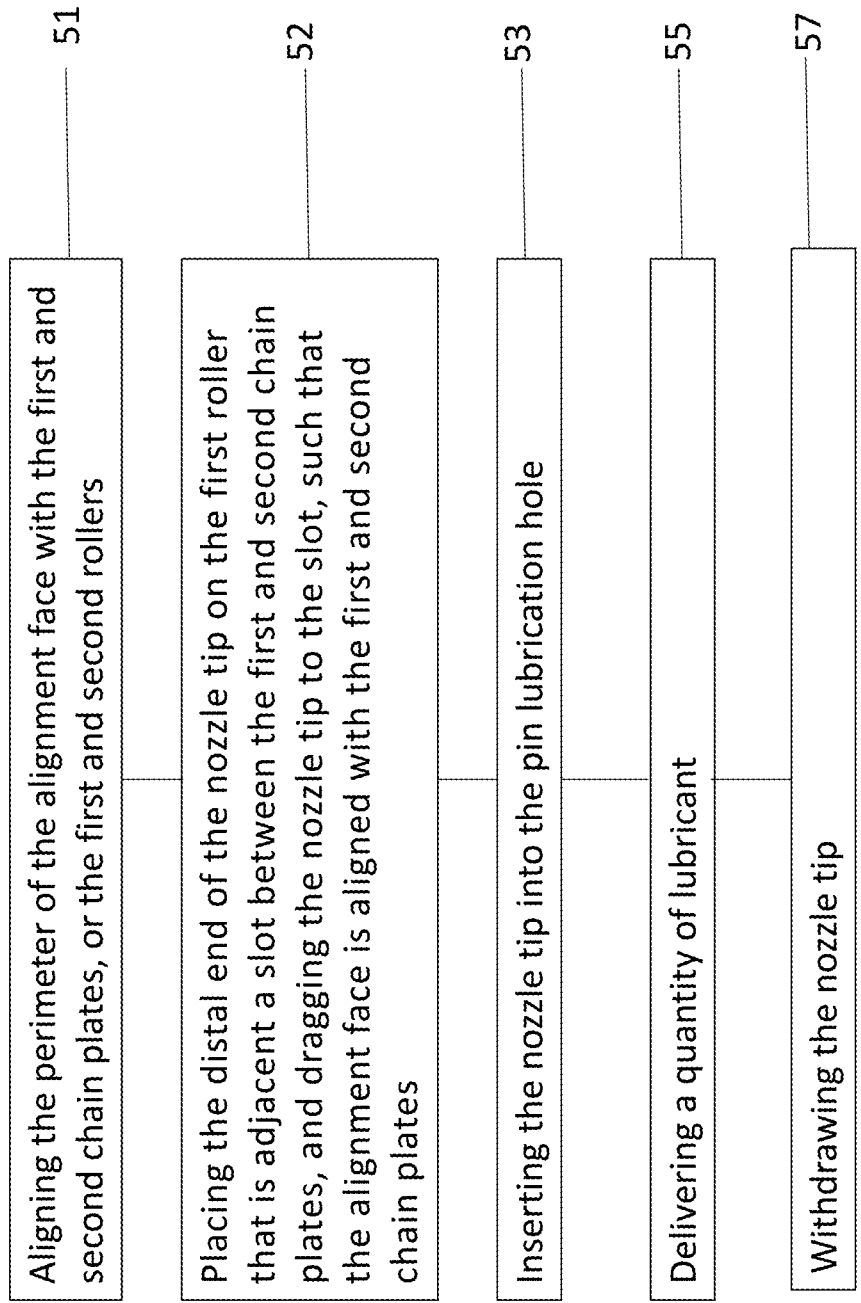
FIG. 7 is a flow diagram showing several steps involved with using the nozzle described above to perform a lubrication on a chain comprising a pin lubrication hole.

FIG. 7 is a flow diagram showing several steps involved with using the nozzle described above and in FIGS. 8 to 15 to perform a lubrication on a chain comprising a pin lubrication hole.

FIG. 7 shows a first step of aligning the perimeter of the alignment face 51 (and alignment faces 67 and 67*b*). This may either be aligned with the first and second chain plates, or with the first and second rollers. In some instances the perimeter of the alignment face may be aligned with both.

It is noted that a prior step 52 may include placing the distal end of the nozzle tip on a first roller adjacent a slot between the first and second chain plates/between the first and second rollers, and dragging the nozzle tip to the slot, such that the alignment face is aligned with the first and second chain plates/the first and second rollers. This may be particularly easy for a user as it means that there is a large area on the first area that the user can initially aim for and the dragging step will by virtue of the alignment face automatically align the nozzle tip and the pin lubrication hole. This therefore may reduce the number of lubrication failures.

The next step 53 comprises inserting the nozzle tip into the pin lubrication hole. Optionally this may be combined with (or alternatively followed by) compressing the gasket to form a seal around the pin lubrication hole. Insertion of the nozzle into the pin lubrication hole enables lubrication to take place. The compression of the gasket may reduce the amount of back flow of lubricant out of the pin lubrication hole as lubricant is applied.

The next step comprises delivering a quantity of lubricant 55. This may therefore lubricate the pin lubrication hole and the associated pin. The quantity of lubricant may be manually selected. Alternatively, the amount of lubricant may be pre-set, for example by a control on the lubricant providing device.

The final step may be optional and this comprises withdrawing the nozzle tip out of the pin lubrication hole. This may complete the lubrication procedure.

Figure 8:
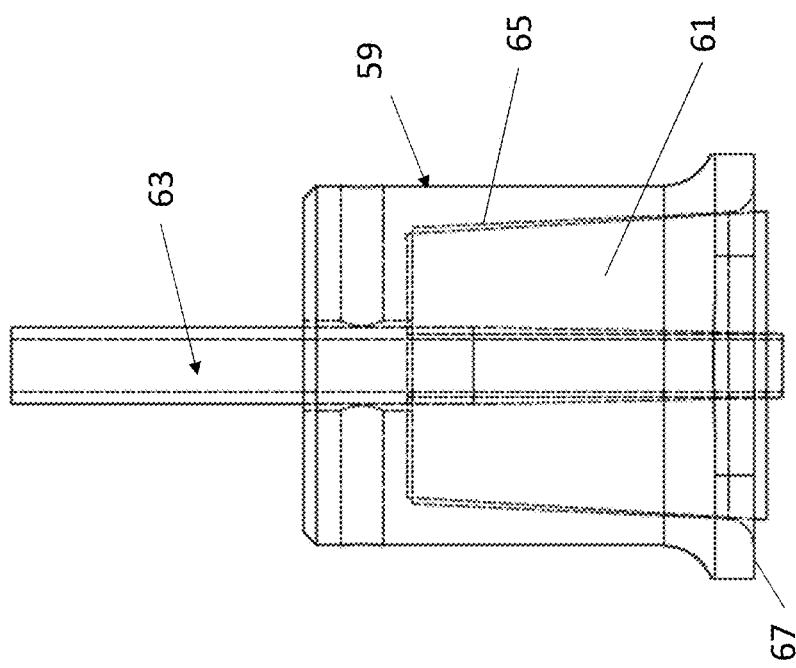
FIG. 8 shows a second embodiment of the present invention, comprising a rectangular nozzle body with a cavity.

FIG. 8 shows a nozzle for lubricating a chain, the nozzle comprising: a nozzle tip; a nozzle body configured to house the nozzle tip; the nozzle tip comprising a proximal end configured to be attached to a lubricant providing device, and a distal end configured to eject lubricant into/onto the chain; the nozzle tip further comprising a first lumen provided between the proximal end and the distal end, the lumen encased within an outer wall, wherein said lumen is configured to allow lubricant to pass therethrough; the nozzle body comprising a second lumen or a cavity, wherein the second lumen or cavity is configured for the nozzle tip to be housed therein; wherein when the nozzle tip is housed within the nozzle body the distal end of the nozzle tip is configured to protrude beyond a distal end of the nozzle body, and the proximal end of the nozzle tip is configured to protrude beyond the proximal end of the nozzle housing; the nozzle body comprising an alignment face, wherein the alignment face is configured to align the nozzle with the chain.

FIG. 8 shows a nozzle for lubricating a chain, the nozzle comprising: a nozzle tip; a nozzle body configured to house the nozzle tip; the nozzle tip comprising a proximal end configured to be attached to a lubricant providing device, and a distal end configured to eject lubricant into/onto the chain; the nozzle tip further comprising a first lumen provided between the proximal end and the distal end, the lumen encased within an outer wall, wherein said lumen is configured to allow lubricant to pass therethrough; the nozzle body comprising a second lumen or cavity, wherein the second lumen or cavity is configured for the nozzle tip to be housed therein; wherein when the nozzle tip is housed within the nozzle body the distal end of the nozzle tip is configured to protrude beyond a distal end of the nozzle body, and the proximal end of the nozzle tip is configured to protrude beyond the proximal end of the nozzle housing; a gasket, wherein a surface of the gasket is configured to be compressed around a pin lubrication hole of the chain, so as to form a seal around the pin lubrication hole.

FIG. 8 shows a nozzle body 59, gasket 61 and nozzle tip 63 in an arrangement forming a compact, friction fitted assembly that may be moved and orientated at various angles without any named element becoming detached. It is understood that the strength of the friction fit seen in the embodiment of FIG. 8 is sufficient to allow the nozzle assembly to be used for the purpose of applying a lubricant (not shown) onto a moving conveyor chain and more specifically locating a pin lubrication hole (not shown). The chain and pin lubrication hole may be as that described in FIGS. 5 and 6 or they may be of another form.

FIG. 8 shows an embodiment of a nozzle body comprising a large conical cavity 65 occupying much of its internal volume. Also seen is that a gasket 61 complementary in shape to this cavity 65, yet slightly larger than it, fills it and protrudes some distance beyond its opening. Other embodiments may involve a gasket 61 only partially filling such cavity 65 and may involve a cavity 65 of another shape and size to that seen in FIG. 8. The tolerances, although not explicitly mentioned in FIG. 8, are understood to be on such a scale so as to ensure a friction fit between the gasket 61 and the internal walls of the cavity 65.

Both the nozzle body 59 and the gasket 61 are seen to share a central axis along which a passage is defined. This passage is defined via lumens (more clearly shown in FIGS. 9 and 10) located in both the nozzle body 59 and the gasket 61 and are sized to allow a nozzle tip 63 to be placed through. Once positioned, the nozzle tip 63 is seen to reside partially within this passage such that a majority of its length is housed within the nozzle body 59 and such that it is centralised with respect to the nozzle body 59. This centralising constraint achieved with the lumens of both the nozzle body 59 and the gasket 61. The nozzle tip 63 is too equipped with a central lumen (not shown) that defines a passage for the delivery of a lubricant to the pin lubrication hole.

Also seen in FIG. 8 is that both ends of the nozzle tip 63 protrude beyond the nozzle body 59. The end of the nozzle tip 63 that protrudes beyond the top of, or the proximal end, the nozzle body 59 may be connected to a lubricant providing device (not shown). The end of the nozzle tip 63 seen to protrude beyond the distal end of the nozzle body 59 is configured to penetrate a pin lubrication hole (not shown here). This distal protruding end 63 has a portion of its length enveloped by the protruding portion of the gasket 61 (whereby the protruding portion of the gasket 61 that envelopes, or is positioned around, it is the portion of the gasket 61 that protrudes beyond the opening of the cavity 65 of the nozzle body). This is a substantially beneficial feature of the present invention as the protrusion of the nozzle tip 63 from the nozzle body 59 allows it to enter a pin lubrication hole (not shown here) and the envelopment of this protruding portion with the rubberised gasket 61 maintains a separation between the nozzle body 59 and the external wall of the lubrication hole (not shown here). When the nozzle tip 63 is pressed into the pin lubrication hole this separation enables the surface of the gasket 61 abutting the external wall of the lubrication hole to be compressed around the pin lubrication hole and form a seal around it. This seal may then prevent the lubricant emitted into the hole from leaking out. This arrangement results in less lubricant wastage and may improve the efficiency of the lubrication process.

Also seen in FIG. 8 is the stepped profile of the nozzle body 59. This stepped profile defines a carefully dimensioned wider lower portion, or alignment portion/face 67, of the nozzle body 59 which has a perimeter sized and shaped so as to conveniently fit in a slot in-between a first chain plate and a second chain plate of the chain. It may additionally, or alternatively, fit in a slot between a first roller and a second roller of the chain. It is understood that when such an alignment/fit is achieved between the alignment face 67 and the chain elements, the nozzle tip 63 is aligned with a pin lubrication hole into which the lubricant is to be delivered.

Figure 9B:
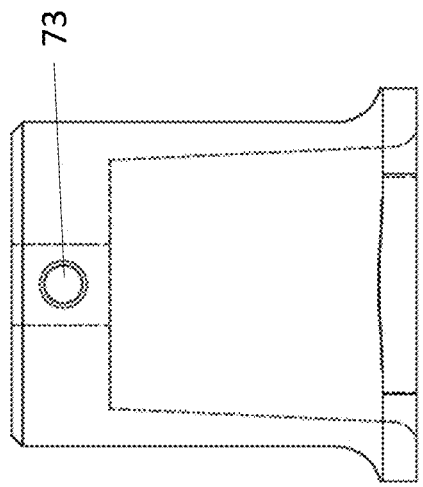
FIGS. 9A-9D show the rectangular nozzle body of the second embodiment from several viewpoints.
Figure 9D:
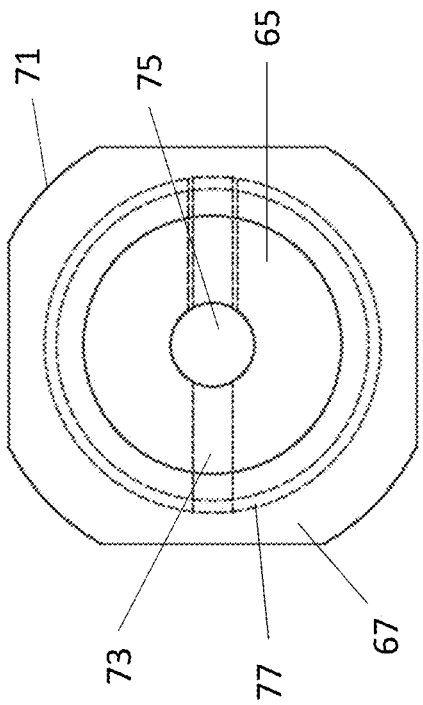
Figure 9A:
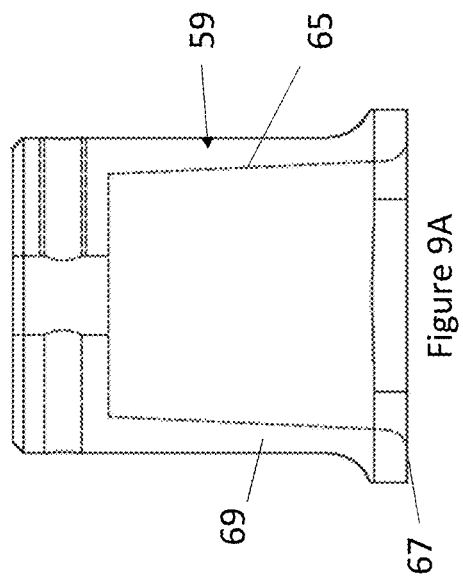
Figure 9C:
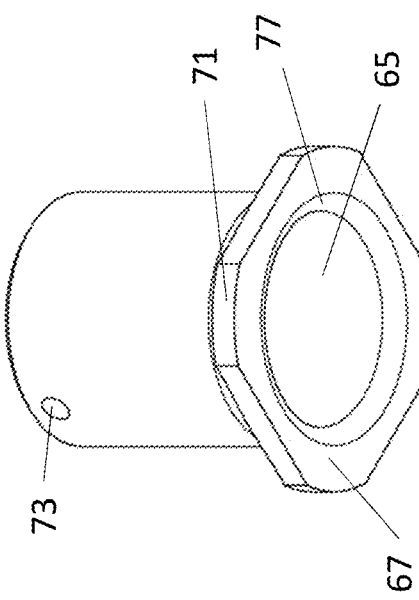

This stepped profile of the nozzle body 59 is further seen in FIGS. 9A-9C. In addition to the alignment portion 67 of the nozzle body there is also seen a gripping portion 69. The gripping portion 69 of the nozzle body 59 seen in FIGS. 9A-9C differs from the alignment portion 67 in that it is of a circular cross section as compared to a square with rounded vertices. The gripping portion 69 is also thinner than the alignment portion 67 and therefore has a diameter smaller than the lengths of each side of the square alignment portion. This arrangement may provide weight saving benefits to the nozzle body 59 and therefore the whole nozzle assembly. This may be of importance given the nature of use whereby a user may need to extend the nozzle some distance away from their body to reach the chain and this would increase the moment acting on a user's arms.

In other embodiments, the shape of both the gripping portion 69 and the alignment portion 67 may be varied from that as described above and that seen in FIGS. 8 and 9. It is entirely possible to have a gripping portion 69 the same shape as the alignment face/portion 67. This shape may be either circular (with the alignment portion 67 having a larger radius than the gripping portion 69), square (with the gripping portion 69 having a smaller width than the alignment portion 67) or other shape. For example, a rectangular shaped alignment portion (although not seen) may provide additional benefits in that it would be compatible for use with two different sloth widths. A first orientation or length may allow for a desired fit with a first slot width/type and a second orientation or length may allow for a desired fit with a second slot width/type. Therefore, a user may be able to use the same nozzle piece to deliver lubricant to two different slot types by merely rotating the nozzle by 90 degrees. Due to the polar symmetry of the nozzle tip, the lubrication process will be unaffected with this change in orientation. It may be advantageous that a first rectangular length be 33 mm and a second rectangular length be 34 mm in such a scenario with the stated dimensions resembling the distance between a first and second chain plate. It is also entirely possible that the alignment portion 67 and the gripping portion 69 be the same size as one another (unstepped structure), in which case, it may be beneficial for the gripping portion 69 to be sized in accordance with the alignment portion 67.

Also seen in FIGS. 9C and 9D is that the vertices 71 of the alignment face are filleted (curved). This curved portion may allow for the easier entry of the nozzle body 59 into the slot of the chain when initially placed onto it; the curved portions guiding the nozzle body into the slot. This increase in tolerance may make locating the pin lubrication hole easier, especially if a user is located some distance away from the chain, and makes the process more efficient and streamlined.

FIGS. 9B and 9C show a gripping lumen 73 that intersects perpendicularly with the central lumen 75 of the nozzle body. This gripping lumen 73 may house a grub screw (not shown) which may maintain the attachment of the nozzle tip 63 within the nozzle body 59 at the desired length via a friction fit; the tip of the grub screw abutting a point on the length of the nozzle tip 63. It is understood that the length by which the nozzle tip 63 protrudes form the nozzle body 59 may be controlled via such attachment and that such arrangement may work in conjunction with other constraining means to locate the nozzle tip 63 within the nozzle body 59. For example, a friction fit between the nozzle tip and the gasket. Although not seen, the nozzle body may comprise a pair, or a plurality more, of these gripping lumens 73 (and grub screws) to enable a more stable securement on the nozzle tip 63.

FIG. 9D more easily displays the central lumen 75 used to accommodate the nozzle tip 63 within the nozzle body 59. It is evident that this lumen 75 is central with respect to the alignment face 67 and the nozzle body 59. Such arrangement constrains the nozzle tip 59 centrally within the alignment face and provides a user with a consistent reference point when the tip of the needle is screened from vision by the chain and the nozzle body when lubricating.

Also seen in FIGS. 9A to 9D is a chamfer ring 77 at the base of the cavity that allows space for the compression (and therefore radial expansion) of the gasket to form a seal around a pin lubrication hole.

Figure 10C:
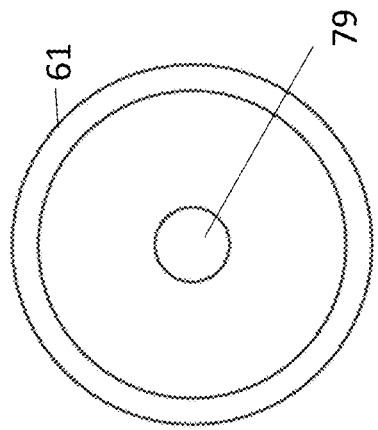
FIGS. 10A-10C show the gasket of the second embodiment from various viewpoints.
Figure 10B:
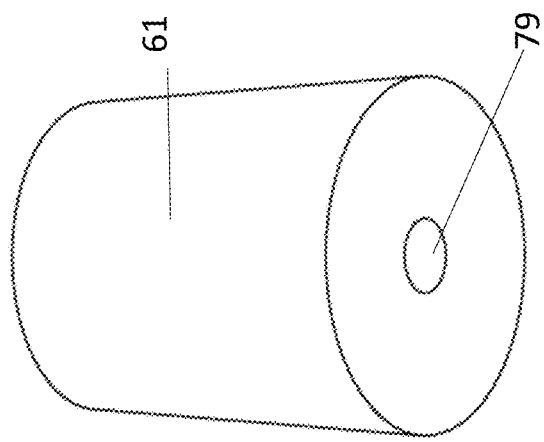
Figure 10A:
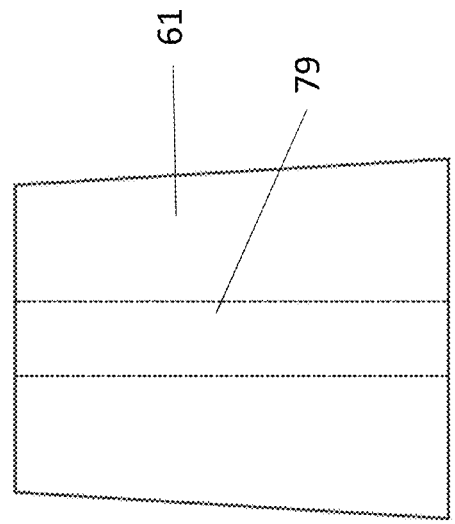

FIGS. 10A-10C isolate the gasket 61 that is to be fitted into the cavity of the nozzle body 59. It is clear in these Figures that the gasket 61 is in the shape of a conical frustum and resembles a test tube bung. It may be that the gasket 61 is formed from a test tube bung of an appropriate size. In the embodiment seen in FIGS. 8 and 10, the gasket 61 may have a depth in the range of 5-10 mm and the depth may be 1 mm larger than the depth of the cavity 65 so as to ensure the gasket 61 protrudes at least 1 mm from the opening of the cavity 65. This shall ensure the gasket 61 protrudes from the cavity 65 opening and enable it to form a seal around the pin lubrication hole.

It is understood that the shape of the gasket 61 is complementary to the shape of the nozzle body cavity 65. Therefore, in other embodiments, it is entirely possible that the gasket 61 and cavity 65 take another form, whether in size or shape, yet achieve the same friction fit as described above. It is also understood that the gasket 61 is composed/formed of a heatproof material such as heatproof silicone or fluororubber. Alternatively, the gasket may be composed of other materials.

Also seen in FIGS. 10A-10C is a central lumen 79 spanning the depth of the gasket. This central lumen 79 houses and attaches with the nozzle tip 63 (shown in FIG. 11) via a friction fit.

Figure 11:
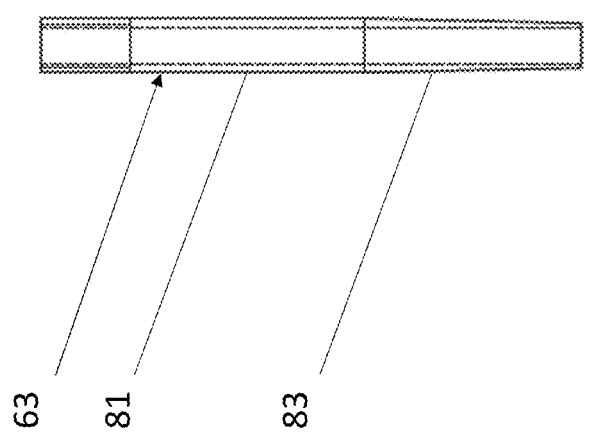
FIG. 11 shows a nozzle tip to be used alongside the rectangular nozzle body and gasket of the second embodiment.

FIG. 11 also illustrates the structure of the nozzle tip 63 in this embodiment. The nozzle tip 63 comprises a first cylindrical portion 81 that is to be located adjacent the top of the nozzle body and a distal tapered portion 83 to be located adjacent the bottom of the nozzle body. This tapered end is shaped as a conical frustum and may aid in the assembly process of the nozzle as it may allow for easier entry into the nozzle body-gasket arrangement. A smaller diameter of the tapered end 83 may result in it not being acted upon, or acted upon to a lesser extent, with the friction from the gasket as slides into position. Therefore allowing for the easier entry.

In other embodiments, the nozzle tip may be tapered from a point in its length that is closer to the top in the Figure seen or from a point that is closer to the bottom. Alternatively, the nozzle tip may not comprise a taper and be of a consistent diameter throughout its length.

The top of the nozzle may comprise an attachment means (not shown) so that the nozzle tip may be connected with a lubricating providing device such as a canister or tube (not shown). This attachment means may be a screw thread whereby a complementary thread exists on an attachment means of the lubricating providing device.

FIG. 12 shows an embodiment of a nozzle assembly whereby the nozzle body 59b comprises a central lumen 75b spanning a majority of its depth with said lumen sized such that it accommodates, with a tight tolerance, the nozzle tip 63b without the gasket. From an external view, the embodiments of FIG. 11 and FIG. 8 may show little difference as both embodiments comprise a protruding nozzle tip 63b from either end of the nozzle body and a rubberised gasket 61b enveloping the distal protruding end of the nozzle tip 63b. Both embodiments also comprise a similarly shaped nozzle body.

FIGS. 13A-13C further illustrates this consistency in the external structure of the nozzle body 59,59b of both the aforementioned embodiments with the nozzle bodies once again comprising a square alignment base 67b and a cylindrical gripping portion 69b. However, the embodiment of FIG. 12 comprises a much longer lumen 75b and much shallower cavity 65b than in FIG. 8. Here, it is assumed that a cavity is defined as the internal volume of the nozzle body configured to accommodate the width of a gasket and being wider than that of a lumen configured to house just a nozzle tip.

Figure 14:
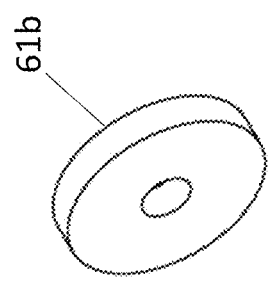
FIG. 14 shows the gasket of the third embodiment.

The cavity 65b present in FIG. 12 is such that its negative volume takes the form of a disc and therefore the gasket 61b that is to be friction fitted within it also takes this disc-like form. This disc gasket 61b is seen in FIG. 14. It may be that the diameter of the disc is between 10 mm and 30 mm. It may also be that the depth of the disc is between 5 mm and 10 mm and whereby the depth of the cavity is 1 mm less than this.

Figure 15:
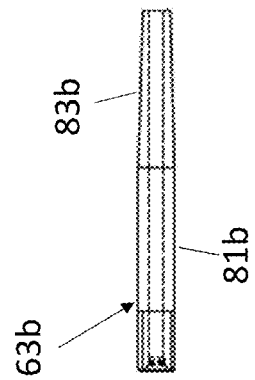
FIG. 15 shows a nozzle tip to be used alongside the rectangular body and gasket of the third embodiment.

FIG. 15 shows a nozzle tip 63b to be placed within the nozzle shown in FIGS. 12 to 14. The nozzle tip 63b very closely resembles the nozzle tip of FIG. 11. However, in this embodiment the nozzle tip 61b may additionally benefit from its tapered end 83b. Here, the tapered end 83b friction fits with the disc gasket 61b, whereas previously in the embodiment of FIG. 8 the friction fit between the gasket and the tip may have been at the cylindrical portion of the nozzle tip. Friction fitting the gasket 61b at the tapered end 83b may allow for easier adjustment of the length of the nozzle tip 63b that protrudes from the nozzle body 59b in the assembling process as it is visible to the assembler.

The nozzle tip shown here may further benefit from castellations (not shown) present at the tapered end which may allow for a stronger friction fit with the gasket. Additionally, an indent (not shown) may also be utilised to house a gasket 61b at the desired location on the nozzle tip.

It is understood that the gasket 61b may friction fit with the internal walls of the cavity 65b of the nozzle body as well as the nozzle tip 63b.

The above embodiments are to be understood as illustrative examples. Further embodiments are also envisaged. It is to be understood that any feature described in relation to any one embodiment may be used alone, or in combination with other features described and may also be used in combination with one or more features of any other of the embodiments, or any combination of any other of the embodiments.

Furthermore, equivalents and modifications not described above may also be employed without departing from the scope of the invention, which is defined in the accompanying claims.

In some examples, one or more memory elements can store data and/or program instructions used to implement manufacture or use of devices described herein. Embodiments of the disclosure provide tangible, non-transitory storage media comprising program instructions operable to program a processor to said manufacture method and/or claimed herein.

For example, an autonomous machine may implement the method of use set out above. Alternatively or in addition, an autonomous machine may manufacture the nozzle. The processor of such manufacturing or method implementing apparatus (and any of the methods, activities or instructions outlined herein) may be implemented with fixed logic such as assemblies of logic gates or programmable logic such as software and/or computer program instructions executed by a processor. Other kinds of programmable logic include programmable processors, programmable digital logic (e.g. a field programmable gate array (FPGA), an erasable programmable read only memory (EPROM), an electrically erasable programmable read only memory (EEPROM), an application specific integrated circuit (ASIC) or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof. Such data storage media may also provide the data storage of the manufacturing or usage device.

CLAUSES

Clause 1. In an exemplary aspect, a nozzle is provided for lubricating a chain. In this aspect, the nozzle includes a nozzle tip; a nozzle body configured to house the nozzle tip; the nozzle tip comprising a proximal end configured to be attached to a lubricant providing device, and a distal end configured to eject lubricant into/onto the chain; and the nozzle tip further comprising a first lumen provided between the proximal end and the distal end, the lumen encased within an outer wall. Moreover, said lumen is configured to allow lubricant to pass therethrough; the nozzle body comprising a second lumen, wherein the second lumen is configured for the nozzle tip to be housed therein. When the nozzle tip is housed within the nozzle body the distal end of the nozzle tip is configured to protrude beyond a distal end of the nozzle housing, and the proximal end of the nozzle tip is configured to protrude beyond the proximal end of the nozzle housing. Yet further, the nozzle body comprises an alignment face, wherein the alignment face is configured to align the nozzle with the chain.

Clause 2. In an exemplary aspect, the nozzle of clause 1 further comprises a gasket, the gasket comprising a torus, and wherein the gasket is configured to be positioned at the distal end of the tip, optionally wherein the gasket is a rubberised torus.

Clause 3. In an exemplary aspect, for the nozzle of any preceding clause, the alignment face is shaped and dimensioned such that at least a portion of the perimeter of the alignment face aligns either: with a slot in between a first chain plate and a second chain plate of the chain; and/or with a slot between a first roller and a second roller of the chain.

Clause 4. In an exemplary aspect, for the nozzle of clause 3, the perimeter of the alignment face aligns with the slot between the first chain plate and the second chain plate, the nozzle tip is aligned with a pin lubrication hole into which the nozzle tip is configured to be placed.

Clause 5. In an exemplary aspect, for the nozzle of clauses 3 or 4, the alignment face is circular with a diameter of between 25 mm and 50 mm, optionally wherein the diameter is between 30 mm and 40 mm, and further optionally wherein the diameter is 35 mm.

Clause 6. In an exemplary aspect, for the nozzle of any preceding clause, the second lumen is central within alignment face.

Clause 7. In an exemplary aspect, for the nozzle of any preceding clause, the second lumen is central within the nozzle body.

Clause 8. In an exemplary aspect, for the nozzle of any preceding clause, the nozzle body comprises two portions, the first portion comprising the alignment face, and the second portion comprising a gripping portion.

Clause 9. In an exemplary aspect, for the nozzle body of clause 8, the first portion and second portion are stepped, such that the first portion and second portion have different radii.

Clause 10. In an exemplary aspect, for the nozzle of clause 9, the radius of the first portion is greater than the radius of the second portion.

Clause 11. In an exemplary aspect, for the nozzle of clauses 8-10, the first portion and the second portion are cylindrical.

Clause 12. In an exemplary aspect, for the nozzle of any of clauses 8-11, the gripping portion comprises at least one gripping lumen substantially perpendicular to the second lumen, wherein the gripping lumen is configured to house a grub screw.

Clause 13. In an exemplary aspect, the nozzle of clause 12 further comprises at least two gripping lumens.

Clause 14. In an exemplary aspect, for the nozzle of any preceding clause when dependent on clause 2, the alignment face comprises an indent to house the gasket.

Clause 15. In an exemplary aspect, for the nozzle of clause 14, the indent is positioned centrally on the alignment face, and around the second lumen.

Clause 16. In an exemplary aspect, for the nozzle of any preceding clause, the nozzle tip is tapered.

Clause 17. In an exemplary aspect, for the nozzle of clause 16, the distal end of the nozzle tip is tapered.

Clause 18. In an exemplary aspect, for the nozzle of clause 17, the distal end of the nozzle tip forms a conical frustum.

Clause 19. In an exemplary aspect, for the nozzle of any preceding clause when dependent on clause 2, the nozzle tip and the gasket are joined by a friction fit.

Clause 20. In an exemplary aspect, for the nozzle of any preceding clause, the proximal end of the nozzle tip comprises an attachment means, optionally a screw thread.

Clause 21. In an exemplary aspect, for the nozzle of any preceding clause, the distal end of the nozzle tip comprises one or more castellations.

Clause 22. In an exemplary aspect, for the nozzle of any preceding clause, when dependent on clause 2, adjacent the end of the nozzle tip is an indent that is configured to house the gasket.

Clause 23. In an exemplary aspect, for the nozzle of any preceding clause, when dependent on clause 2, the gasket is configured such that in use when the nozzle tip is pressed within the pin lubrication hole of the chain, the gasket is compressed around the pin lubrication hole, so as to form a seal around the pin lubrication hole.

Clause 24. In an exemplary aspect, for the nozzle of any preceding clause, the gasket is an O-ring.

Clause 25. In an exemplary aspect, for the nozzle of any preceding clause, the gasket is formed from fluororubber.

Clause 26. In an exemplary aspect, for the nozzle of any preceding clause, wherein into/onto the chain comprises into a pin lubrication hole situated on the chain.

Clause 27. In an exemplary aspect, for the nozzle of clause 26, the pin lubrication hole is used for connection with an external element.

Clause 28. In an exemplary aspect, for the nozzle of any preceding clause, the chain is a chain within an oven.

Clause 29. In an exemplary aspect, for the nozzle of any preceding clause, the distal end of the nozzle tip is configured to fit within the pin lubrication hole.

Clause 30. In an exemplary aspect, a nozzle for lubricating a chain is provided that comprises a nozzle tip; a nozzle body configured to house the nozzle tip; where the nozzle tip comprises a proximal end configured to be attached to a lubricant providing device, and a distal end configured to eject lubricant into/onto the chain; the nozzle tip further comprises a first lumen provided between the proximal end and the distal end, the lumen encased within an outer wall, wherein said lumen is configured to allow lubricant to pass therethrough; and the nozzle body comprises a second lumen, wherein the second lumen is configured for the nozzle tip to be housed therein. Moreover, when the nozzle tip is housed within the nozzle body, the distal end of the nozzle tip is configured to protrude beyond a distal end of the nozzle housing, and the proximal end of the nozzle tip is configured to protrude beyond the proximal end of the nozzle housing. Moreover, a gasket comprising a torus is provided and the gasket is configured to be positioned at the distal end of the nozzle tip.

Clause 31. In an exemplary aspect, for the nozzle of any preceding clause, a lubricant providing device is provided.

Clause 32. In an exemplary aspect, for the kit of parts of clause 31, a lubricant is provided, optionally wherein the lubricant is perfluorolube, optionally wherein the lubricant is CL1800, optionally wherein the lubricant is CL1800F1.

Clause 33. In an exemplary aspect, for the kit of parts of clause 31 or 32, a chain is further provided.

Clause 34. In an exemplary aspect, a method is provided for lubricating a chain, said chain comprising a first chain plate, a second chain plate and a slot between the first and second chain plates, and a pin lubrication hole. In this aspect, the method comprises aligning the perimeter of the alignment face with either: the first and second chain plates, or the first and second rollers; inserting the nozzle tip into the pin lubrication hole; delivering a quantity of lubricant; withdrawing the nozzle tip.

Clause 35. In an exemplary aspect, for the method of clause 34, aligning the perimeter of the alignment face with the first and second chain plates comprises placing the distal end of the nozzle tip on a first roller adjacent a slot between the first and second chain plates, and dragging the nozzle tip to the slot, such that the alignment face is aligned with the first and second chain plates.

Clause 36. In an exemplary aspect, for the method of clauses 34 or 35, the method further comprises compressing the gasket to form a seal around the pin lubrication hole as/after the nozzle tip is inserted.

Clause 37. In an exemplary aspect, for the method of clauses 34 to 36, the quantity of lubricant is a predetermined quantity.

Clause 38. In an exemplary aspect, for the method of clauses 34-37, the nozzle is the nozzle of any of clauses 1-30.

The invention claimed is:

1. A nozzle for lubricating a chain, the nozzle comprising:
a nozzle tip; and
a nozzle body configured to house the nozzle tip;
wherein the nozzle tip comprises a proximal end configured to be attached to a lubricant providing device, and a distal end configured to eject lubricant into/onto the chain,
wherein the nozzle tip further comprises a first lumen provided between the proximal end and the distal end, the first lumen being encased within an outer wall and configured to allow lubricant to pass therethrough,
wherein the nozzle body comprises a second lumen or a cavity, the second lumen or cavity being configured to house the nozzle tip therein,
wherein, when the nozzle tip is housed within the nozzle body, the distal end of the nozzle tip is configured to protrude beyond a distal end of the nozzle body, and the proximal end of the nozzle tip is configured to protrude beyond the proximal end of the nozzle body, and
wherein the nozzle body comprises an alignment face that is configured to align the nozzle with the chain.

2. The nozzle of claim 1, further comprising a gasket that is configured to be positioned around the tip.

3. The nozzle of claim 2, wherein the gasket comprises a third lumen configured to house the nozzle tip therein.

4. The nozzle of claim 2, wherein:
the nozzle body comprises the cavity,
the gasket is configured to at least partially fill the cavity.

5. The nozzle of claim 2, wherein the gasket is a conical frustum in shape.

6. The nozzle of claim 1, wherein the gasket has a depth of 5-10 mm, and/or wherein the cavity has a depth 1 mm less than the depth of the gasket.

7. The nozzle of claim 2, wherein the gasket is a disk and has a diameter that is between 10 mm and 30 mm.

8. The nozzle of claim 1, wherein the alignment face is shaped and dimensioned such that at least a portion of the perimeter of the alignment face aligns either:
with a slot in between a first chain plate and a second chain plate of the chain; and/or
with a slot between a first roller and a second roller of the chain; and/or
wherein, when the perimeter of the alignment face aligns with the slot between the first chain plate and the second chain plate, the nozzle tip is aligned with a pin lubrication hole into which the nozzle tip is configured to be placed; and/or
wherein the alignment face is rectangular with a first length of the face larger than the second length of the face, the first length being configured for use with a first slot type, and the second length being configured for use with a second type of slot.

9. The nozzle of claim 1, wherein the second lumen or cavity is central within at least one of the alignment face and the nozzle body.

10. The nozzle of claim 1, wherein:
the nozzle body comprises two portions, the first portion comprising the alignment face, and the second portion comprising a gripping portion,
the first portion and second portion are stepped, such that the first portion and second portion have different radii, and
wherein a radius of the first portion is greater than a radius of the second portion.

11. The nozzle of claim 1, wherein the nozzle tip is tapered.

12. The nozzle of claim 2, wherein the nozzle tip and the gasket are joined by a friction fit.

13. The nozzle of claim 1, wherein the proximal end of the nozzle tip comprises an attachment means.

14. The nozzle of claim 2, wherein adjacent the end of the nozzle tip is an indent that is configured to house the gasket, and wherein the nozzle body comprises the second lumen.

15. The nozzle of claim 2, wherein the gasket is configured such that in use when the nozzle tip is pressed within the pin lubrication hole of the chain, the surface of the gasket is compressed around the pin lubrication hole, so as to form a seal around the pin lubrication hole.

16. The nozzle of claim 1, wherein the gasket is formed from fluoro-rubber or heatproof silicone.

17. The nozzle of claim 1, wherein:
into/onto the chain comprises into a pin lubrication hole situated on the chain,
the pin lubrication hole is used for connection with an external element, and
the distal end of the nozzle tip is configured to fit within the pin lubrication hole.

18. A nozzle for lubricating a chain, the nozzle comprising:
a nozzle tip; and
a nozzle body configured to house the nozzle tip,
wherein the nozzle tip comprises a proximal end configured to be attached to a lubricant providing device, and a distal end configured to eject lubricant into/onto the chain;
wherein the nozzle tip further comprises a first lumen provided between the proximal end and the distal end, the first lumen encased within an outer wall and configured to allow lubricant to pass therethrough,
wherein the nozzle body comprises a second lumen or cavity, the second lumen or cavity being configured to house the nozzle tip therein, wherein, when the nozzle tip is housed within the nozzle body, the distal end of the nozzle tip is configured to protrude beyond a distal end of the nozzle body, and the proximal end of the nozzle tip is configured to protrude beyond the proximal end of the nozzle body, wherein the nozzle further includes a gasket having a surface that is configured to be compressed around a pin lubrication hole of the chain, so as to form a seal around the pin lubrication hole.

19. A method of lubricating a chain that includes a first chain plate, a second chain plate and a slot between the first and second chain plates, and a pin lubrication hole, the method comprising:

aligning a perimeter of an alignment face with either the first and second chain plates, or first and second rollers, wherein aligning the perimeter of the alignment face with the first and second chain plates comprises placing a distal end of a nozzle tip on the first roller that is adjacent a slot between the first and second chain plates, and dragging the nozzle tip to the slot, such that the alignment face is aligned with the first and second chain plates;

inserting the nozzle tip into the pin lubrication hole;

compressing a gasket to form a seal around the pin lubrication hole when the nozzle tip is inserted;

delivering a quantity of lubricant; and withdrawing the nozzle tip.

20. The method of claim 19, wherein aligning the perimeter of the alignment face with the first and second chain plates comprises aligning the alignment face in the slot between the chain plates.

21. The method of claim 19, wherein the perimeter is an external geometric portion of the alignment face.

* * * * *